United States Patent
Fei et al.

(10) Patent No.: US 11,966,999 B2
(45) Date of Patent: Apr. 23, 2024

(54) REAL-TIME SIMULATION USING MATERIAL POINT METHOD ON GRAPHICS PROCESSING UNITS

(71) Applicant: TENCENT AMERICA LLC, Palo Alto, CA (US)

(72) Inventors: Yun Fei, Shenzhen (CN); Ming Gao, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 204 days.

(21) Appl. No.: 17/687,531

(22) Filed: Mar. 4, 2022

(65) Prior Publication Data
US 2023/0281748 A1  Sep. 7, 2023

(51) Int. Cl.
G06T 1/20    (2006.01)
G06T 1/60    (2006.01)

(52) U.S. Cl.
CPC .................. G06T 1/20 (2013.01); G06T 1/60 (2013.01); *G06T 2210/21* (2013.01); *G06T 2210/56* (2013.01)

(58) Field of Classification Search
CPC ......... G09G 5/363; G06F 3/1438; G06T 1/20; G06T 1/60; G06T 2210/21; G06T 2210/52; G06T 2210/56
USPC ...................................................... 345/502
See application file for complete search history.

(56) References Cited

U.S. PATENT DOCUMENTS

| | | |
|---|---|---|
| 2006/0087509 A1 | 4/2006 | Ebert et al. |
| 2015/0186565 A1 | 7/2015 | Stomakhin et al. |
| 2015/0187116 A1* | 7/2015 | Stomakhin .............. G06T 13/60 |
| | | 345/419 |
| 2016/0210384 A1 | 7/2016 | Stomakhin et al. |
| 2017/0185701 A1* | 6/2017 | Stomakhin .............. G06F 30/20 |
| 2018/0075173 A1 | 3/2018 | Stomakhin |
| 2020/0082589 A1 | 3/2020 | Teran et al. |

OTHER PUBLICATIONS

Yun Fei et al., "Principles Towards Real-Time Simulation of Material Point Method on Modern GPUs", vol. 1, No. 1, ACM Trans. Graph., Nov. 30, 2021, 19 pgs.
Yun Fei et al., "Revisiting Integration in the Material Point Method: A Scheme for Easier Separation and Less Dissipation", vol. 40, No. 4, Article 10, 16 pgs.
Tencent Technology, ISR and Written Opinion, PCT/US2022/041669, dated Jan. 18, 2023, 6 pgs.

* cited by examiner

*Primary Examiner* — Jacinta M Crawford
(74) *Attorney, Agent, or Firm* — Morgan, Lewis & Bockius LLP

(57) ABSTRACT

An electronic apparatus performs a method of real time simulation of physical visual effect on one or more Graphics Processing Units (GPUs). The method includes a plurality of time steps. Each of the time steps includes: building up a mapping between particles and background grid blocks; sorting the particles to a level of granularity; transferring momenta and masses of the particles to grid nodes on the background grid blocks to compute forces on the grid nodes; updating velocities and resolving collisions from the computed forces on the grid nodes; and applying the updated velocities back to the particles from the grid nodes and advecting the particles. In some embodiments, the frequency of building up and sorting is reduced compared with the frequency of transferring, updating, and applying in the plurality of time steps.

19 Claims, 30 Drawing Sheets

2100 a plurality of time steps 2102, each of the time steps including building up a mapping between particles and background grid blocks 2104 sorting the particles to a level of granularity 2106 transferring momenta and masses of the particles to grid nodes on the background grid blocks to compute forces on the grid nodes 2108 updating velocities and resolving collisions from the computed forces on the grid nodes 2110 applying the updated velocities back to the particles from the grid nodes and advecting the particles 2112 the frequency of building up and sorting is reduced compared with the frequency of transferring, updating, and applying in the plurality of time steps 2114

FIG. 21

REAL-TIME SIMULATION USING MATERIAL POINT METHOD ON GRAPHICS PROCESSING UNITS

TECHNICAL FIELD

The present disclosure relates generally to image technologies, and in particular, to real-time image simulation methods and systems.

BACKGROUND

Cinematic narratives in modern games, as well as other real-time applications (e.g., virtual production, avatar live-streaming, and cloud gaming), are becoming increasingly extensive, causing a great demand for more refined visual effects production. Creating an atmosphere that meets the plots' requirements in a natural scenario may require realistic snow, sand, and water simulation. Meanwhile, the effects of hair and clothes are crucial to a character's personality.

Using physical simulation to generate large-scale, plausible natural or character-related effects has become a standard in the production of films. The material point method (MPM) is widely used due to its quantitative accuracy and strong generalization capability, enabling the plausible simulation of various complex materials and the coupling between those materials. However, the computations required for high-quality scenarios are generally immense, deterring its adoption in real-time applications. Recently, to make the MPM more efficient, MPM is developed on graphics processing unit (GPU), and further on multiple GPUs. At the same time, Taichi framework was revealed, which is more convenient for developing MPM on the GPU.

Compared with the MPM implementations on central processing unit (CPU), these methods or frameworks have significantly improved the performance. However, the improved performance still has a particular gap with the performance required by real-time applications. Besides, these works mainly focus on optimizing performance in the case of large numbers of particles, and few works have been done to minimize the extra cost of memory access or synchronization, which are critical for real-time applications that usually require a small number of particles but with a much tighter temporal budget. Additionally, there is no sufficient ablation test for each performance optimization strategy, so the later researchers may hardly know where to optimize further.

SUMMARY

To overcome the defects or disadvantages of the above mentioned methods, improved systems and methods of real-time simulating visual effects on one or more GPUs are needed.

Through extensive investigation and comprehension of modern GPU architecture, the technical improvements are disclosed herein that can accelerate the computation process on both single-GPU and multi-GPUs. The effectiveness of these improvements are further demonstrated by applying them to the material point method (MPM) to build up the improved framework, which achieves 1.7×-8.6× speedup on single-GPU and 2.5×-14.8× on multi-GPUs compared to some existing state-of-the-art. As the process disclosed herein is specifically designed for real-time applications (i.e., scenarios with small to medium particles), better acceleration is achieved with fewer particles.

In computer graphics, the simulation of real-time visual effects has a broad application to create impressive special effects of games and films.

In the present disclosure, systems and methods are implemented to simulate real-time visual effects in a unified computational framework by taking advantage of the power of, for example, the Material Point Method (MPM).

According to a first aspect of the present application, a method of real time simulation of physical visual effect on one or more Graphics Processing Units (GPUs) includes a plurality of time steps. Each of the time steps includes: building up a mapping between particles and background grid blocks; sorting the particles to a level of granularity; transferring momenta and masses of the particles to grid nodes on the background grid blocks to compute forces on the grid nodes; updating velocities and resolving collisions from the computed forces on the grid nodes; and applying the updated velocities back to the particles from the grid nodes and advecting the particles. In some embodiments, the frequency of building up and sorting is reduced compared with the frequency of transferring, updating, and applying in the plurality of time steps.

According to a second aspect of the present application, an electronic apparatus includes one or more processing units, memory and a plurality of programs stored in the memory. The programs, when executed by the one or more processing units, cause the electronic apparatus to perform the one or more methods as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the one or more methods as described above.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 21 is a block diagram illustrating an exemplary process 2100 of real time simulation of physical visual effect on one or more GPUs, in accordance with some implementations of the present disclosure.

Figure 1:
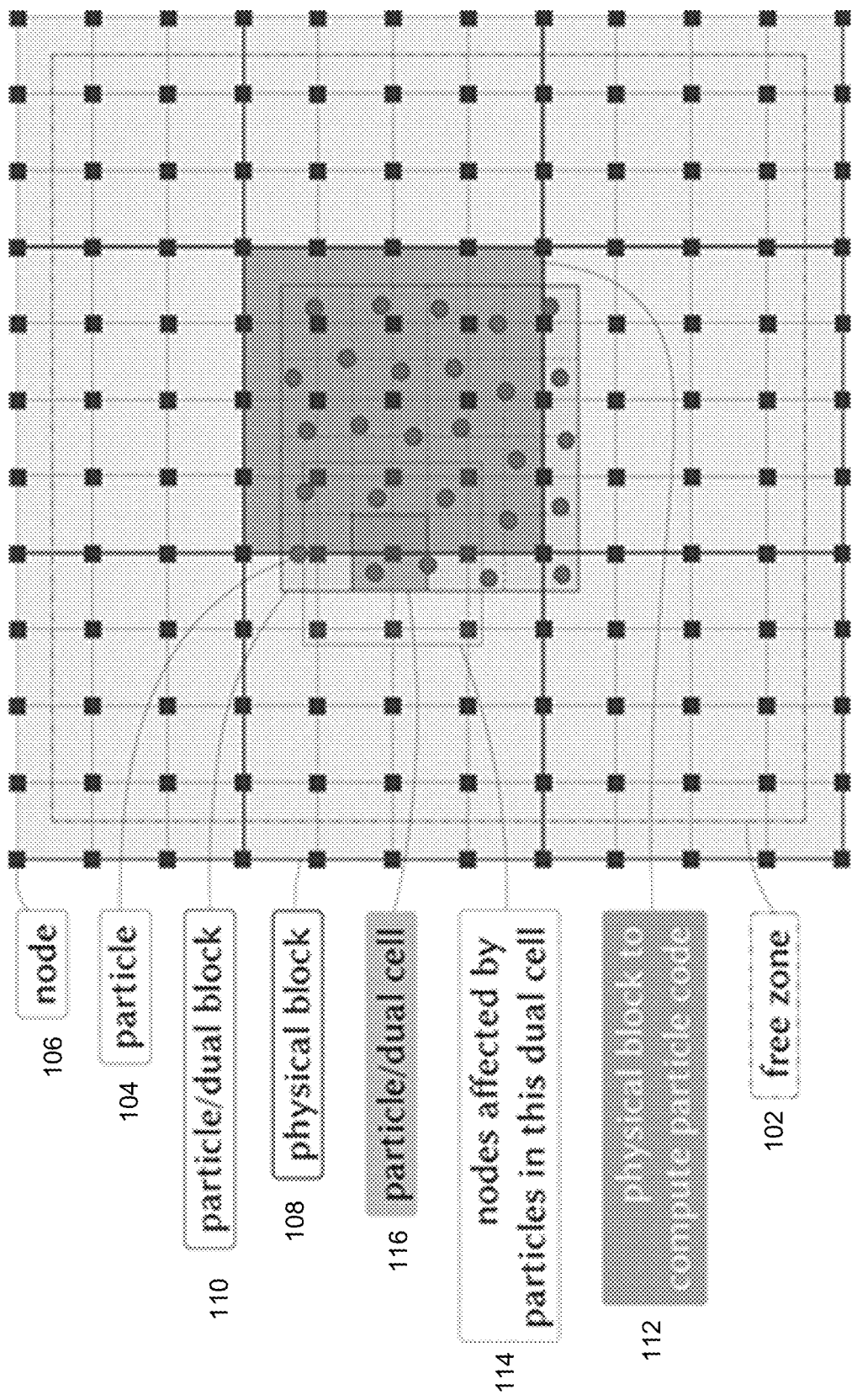
FIG. 1 illustrates a mapping between a free zone, particles, nodes, and physical blocks, in accordance with some implementations of the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices.

Before the embodiments of the present application are further described in detail, names and terms involved in the embodiments of the present application are described, and the names and terms involved in the embodiments of the present application have the following explanations.

Time step: small steps used for advancing in real time to compute the solution for an unsteady flow problem where the properties of the flow vary with time. The time between each iterative solve is specified, for instance, the solver will start doing the solution in the specified time intervals and will continue until the specified final time. Time step is the incremental change in time for solving the governing equations while time interval is the period of time elapsing while the phenomenon is happening.

MPM: Material Point Method is a simulation method of material movement and deformation including the following steps: Particle to grid transfer (P2G); Grid velocities computation; Degrees of freedom Identification; Grid forces computing; Grid velocity updating; Panicle deformation gradient; Grid to panicle transfer (G2P); Particle advection; Grid resetting; and Repetition of the above processes.

SPGrid: Sparse Paged Grid is a data structure for the stream processing of uniform grids that are sparsely populated.

CUDA: Compute Unified Device Architecture is an application programming interface (API) and a parallel computing platform that allows software to use certain types of graphics processing unit (GPU) for general purpose processing.

Warp: a set of threads within a thread block and all the threads in a warp execute the same instruction.

Material point method (MPM) is a comprehensive simulation framework. MPM uses both Lagrangian and Eulerian representations and has been used in many works in mechanics as well as computer graphics to simulate complex phenomena including fluids, solids and coupling between different materials. In some embodiments of this disclosure, code optimization on the GPU of the MPM is implemented. The optimization methods apply to all the phenomena that can be simulated with MPM, and also can be helpful to other similar frameworks using a mixed Lagrangian-Eulerian representation (e.g., fluid simulation with an implicit pressure solve).

With the rapid development of computing architectures and software stacks, GPU has become a powerful tool in real-time physical-based simulation. GPU has the benefits of better energy efficiency and higher performance-per-dollar. However, migrating a CPU simulation algorithm to the GPU without a significant performance regression is non-trivial. The GPU has single instruction, multiple data (SIMD) architectures and unique memory models that require special treatment on memory access and program design.

Most research works focus on acceleration with a single GPU. A common expectation is that multiple GPUs can provide higher computational power and performance than a single GPU. However, physical simulation with multiple GPUs is more challenging than a single one due to the low bandwidth of Peripheral Component Interconnect Express (PCIe). The extra cost of communication brought by multiple GPUs becomes even more significant when pursuing real-time simulation. The computational scale is usually tiny for real-time cases, and most time can be spent on communication if the code is not well-optimized.

Physics-based simulation has been actively employed in generating offline visual effects in the film and animation industry. However, the computations required for high-quality scenarios are generally immense, deterring its adoption in real-time applications, e.g., virtual production, avatar live-streaming, and cloud gaming.

Most prior works focus on accelerating MPM simulation performed in a large-scale, off-line environment. In some embodiments of the present disclosure, a real-time MPM simulation may have different considerations, and multi-GPU acceleration is implemented to the real-time domain. Several technical improvements are disclosed herein, with which a real-time MPM simulation with 55 thousand (hereinafter thousand is referred to as "K") particles can be 14.8× faster than the state-of-the-art, and 2.5× faster for off-line MPM simulation with 12 million (hereinafter million is referred to as "M") particles.

In order to improve the performance of GPU-MPM and have its performance reach the requirements of real-time applications, the following methods and systems are disclosed.

In some embodiments, optimization methods are implemented that significantly improve the performance of MPM on single or multiple GPUs, providing excellent scaling on a multi-GPU platform even when the number of particles is relatively small (e.g., less than 100 K).

In some embodiments, choices of different methods are optimized based on test and analysis results, and a more efficient implementation for simulations at different scales is achieved, which achieves 1.7×-8.6× speedup on single-GPU and 2.5×-14.8× acceleration on four GPUs compared with the state-of-the-art.

In some embodiments, material point method (MPM) on a single GPU is described in detail below. Some works also focus on optimizing material point method on GPUs. All of them share a similar procedure that contains the following phases for each time step:

Rebuild-mapping: building up the mapping between particles and background grid blocks;

Sort-particle: sorting particles to the appropriate level of granularity: the level of cells or the level of blocks;

Transfer-particle-to-grid: transferring particle momenta and masses to grid nodes and computing nodal forces;

Update-grid: updating nodal velocities and resolving collisions on grid nodes;

Transfer-grid-to-particle: transferring new velocities back to particles from grid nodes and advecting particles.

In some embodiments, the rebuild-mapping phase consists of several sub-steps. First, particle codes are computed from particle positions, and a simplified version of (GPU) sparse paged grid (SPGrid) is used that interleaves the three-dimensional 32-bit indices of particles into a 64-bit offset. The higher bits encode the block information (block code) while the lower bits encode the cell information (cell code). With the particle codes, a hash table is constructed to record all blocks in which particles reside (named as a geometric block, or gblock). Next, the hash table is updated by recording all the 3×3×3 neighboring blocks of each geometric block. These blocks, including the gblocks and their neighboring blocks, cover all the nodes the particles may talk to through B-spline quadratic weighting functions. This group of blocks are named as physical blocks (pblock), of which the gblocks are a subset. These pblocks are sparsely populated in space while they are consecutively stored and indexed in memory. In this disclosure, the block code would have a sense of space while the block index is used to record the block's memory location, and the mapping is updated between them during the rebuild-mapping phase.

As the shared memory has a limited size on streaming multi-processors, prior works require that the particles handled by a Compute Unified Device Architecture (CUDA) block should come from the same particle block so that the amount of shared memory allocated to each CUDA block can be reasonably small. To achieve this, the particles from the same particle block are partitioned into a few CUDA blocks and such CUDA blocks are named as "virtual blocks" (or vblock). In contrast, in some embodiments, the process disclosed herein gets rid of shared memory, and particles are divided to warps. In some examples, particles in the same warp are originated from the same particle block in the rebuild-mapping phase and each CUDA block can handle warps from different particle blocks.

There are several choices of algorithms for sorting particles. Radix-sort using the particle codes as keys is the simplest. However, a histogram-sort performs more efficiently, where the keys are computed through concatenating the block index and the cell code. Therefore, in some embodiments, histogram-sort is implemented for sorting particles. Unlike prior works that only sort the particles to the granularity of blocks, in this disclosure, the particles are sorted to the granularity of cells. There are two benefits of this choice. First, processing particles that are sorted with respect to cells during the particle-to-grid (P2G) and grid-to-particle (G2P) transfer is more efficient since processing can read from or write to consecutive memory. Second, it enables using the warp-level reduction before atomically writing data to nodes for expedited P2G transfers, which leads to much less atomic operations compared with works using block-level sorting. The P2G kernel also computes each particle's plasticity, stress, and body force before conducting the actual P2G transfer. After P2G, the computations on the grid nodes take the collisions with boundaries into consideration to update the nodal velocities. Then final G2P phase transfers velocities back to particles.

In some embodiments of the present disclosure, a merging kernels method or system is implemented. The key benefit of merging kernels is that specific global memory accesses can be avoided for the variables that are not part of the system states. For example, the stresses computed on particles are temporary states used to compute the nodal forces and do not need to be stored in the global memory for the next step, and therefore, the stresses with P2G are computed in the same kernel.

In some embodiments, the method of merging kernel is implemented by postponing the update of deformation gradient at the end of G2P to the beginning of P2G to avoid the redundant write operations. In another embodiments, the method of merging kernel is moved one step further to merge quite a lot of kernels into a single large kernel—the G2P2G kernel.

Nevertheless, a kernel that is too complicated may also introduce additional costs or limitations in certain situations. For example, it would be challenging to simulate Lagrangian MPM models (e.g., hair or cloth) with a G2P2G kernel, as these models usually require sophisticated modifications to the particles' velocities. Also, operations such as the addition and deletion of particles are not easily supported in G2P2G as they usually happen between G2P and P2G. As further described below, one experiment is also conducted to illustrate that combining G2P2G with the present process disclosed herein would only deliver better performance when the number of particles is relatively small. In some embodiments, the compiled Syntactically Awesome StyleSheets (SASS) code of G2P2G is extended and contains some long-distance jumps. When there are many particles so that there are many warps to be executed, the execution between warps can vary, requiring a large instruction cache. Because the latter is limited, a dramatic increase of instruction cache miss is observed, which can be justified by a noticeable rise of stall no instruction in Nsight Compute analysis.

In some embodiments of the present disclosure, to avoid these drawbacks of G2P2G, the two transfer phases are separated unless there is no hair or cloth and the number of particles is small (e.g., less than 100 K in this disclosure). However, all the computations are merged on particles, i.e., singular value decomposition, plasticity projection, stress computation, into a single P2G phase.

In some embodiments, by merging small kernels into an appropriate size, the stream multiprocessors (SMs) can overlap memory accesses with computations for better performance through warp scheduling. Warp scheduling is efficient and costs only one cycle to switch between two warps. For example, the P2G kernel overlaps the writing operations at the end of it with the computations at its beginning. Besides, when the simulation resolution is small, there are only a limited number of thread blocks. The SM groups thread blocks into a specific size (known as a wave) and execute the thread blocks wave by wave. Without merging kernels, the thread blocks would not have enough computations; the limited number of threads in the last wave makes SM idling, wasting a large portion of computational power. Such inefficiency is also known as the tail effect. With merging, these trivial computations can be executed and overlapped with other heavier computational or memory operations, eliminating the tail effect and drastically improving the overall performance.

In some embodiments, minimizing non-essential computations are implemented. As mentioned in the previous section, the computations per time step can be divided into two groups. Specifically, for the five phases of the MPM, the first two may be considered as the non-essential ones and the other three as the essential ones. While the essential phases would always stay in place, the non-essential phases can sometimes be removed to save the cost of performing them. One may simply remove them to ignore rebuilding mapping and use a dense background grid, or remove the particle sorting not to concern the performance of the memory operations. Such simple ways, however, would always bring some other side effects that impact the overall performance. Instead, in this disclosure, a new method is developed that vastly reduces the frequency of these two non-essential phases to achieve substantial computational savings without bringing other side effects. In other words, instead of running them every time step, they are now conducted once every few time steps with appropriate modifications.

In some embodiments, to rebuild mapping between the particles and nodes, particles are initially divided/sorted into non-overlapping particle blocks. For example, a particle block is shifted by half-dx with respect to a grid block, such that the particles assigned to this particle block will touch and will only touch the nodes of its 2×2×2 neighboring blocks. A particle's assigned block can be then found by right-shifting its code only to keep the higher bits, and the neighboring blocks can also be retrieved either via the hash table or via an explicitly stored vector. In the next step, as the particles advect, some may end up with positions outside of their original particle block and need to talk to the nodes that are not tracked. Thus rebuilding the mapping between particles and grid blocks is inevitable. The aim of rebuild-mapping is not to find the grid block in which a particle resides but rather to provide the memory addresses of the neighboring 27 nodes with which the particle will interact through a quadratic kernel. If the moving range of a set of particles is known and fixed in a few steps, one may find all the nodes that possibly interact with these particles and build the mapping between them once for all these steps.

FIG. 1 illustrates a mapping between a free zone 102, particles 104, nodes 106, and physical blocks 108, in accordance with some implementations of the present disclosure. For the particles 104 in a particle block 110, their codes are computed through the physical block 112 that has 0.5dx shifting from the particle block 110 during rebuild-mapping. Without triggering another rebuild-mapping, these particles can move in the free zone 102 and affect (potentially) 12×12 (or 12×12×12 in 3D) nodes 114 in 3×3 (or 3×3×3 in 3D) physical blocks.

In this disclosure, the particles are allowed to move within a $(10dx)^3$ range (referred to as a free zone 102, see FIG. 1 for an illustration) without triggering rebuild-mapping. Instead of 2×2×2 neighboring blocks, particles are divided into blocks with a negative-half-dx shifting and keeping track of its 3×3×3 neighboring blocks. As long as the particles move in the free zone 102, they are free from rebuild-mapping. In other words, all the grid nodes with which the particles communicate are known, and their addresses can be computed from the blocks' codes.

Utilizing the free zone can substantially reduce the frequency of rebuild-mapping. The Courant-Friedrichs-Lewy (CFL) condition usually prevents particles from traveling a distance longer than the cell 116 size dx within a time step, and thus using a free zone 102 with 10dx wide may potentially reduce the frequency of rebuild-mapping from every step to per four steps (assuming the extreme case, e.g., a particle 110 on the edge of a dual block moves away from the block with one dx per step). In the test case described herein where each frame contains 36 steps, however, the rebuild-mappings happen only every 10-30 steps, and each frame only needs 1-4 rebuild-mappings.

In some examples, transferring particle properties to grid nodes are allowed after advection within the G2P2G step as it is impossible to rebuild the mapping inside a kernel. However, in those cases, rebuild-mapping still happen every time step. 2×2×2 blocks are used with one-and-half dx shifts, while the free zone in the present disclosure is designed with a larger size to reduce further the frequency of rebuilding. One can push to use more neighboring blocks than the embodiments disclosed herein, and to the extreme one would end up with a dense background grid, where the rebuilding mapping can be removed entirely.

In some embodiments of the present disclosure, it takes a longer time to hash more neighboring blocks. However, the hashing only happens during rebuild-mapping. Because rebuild-mapping only happens over a few steps, the cost of the entire rebuilding is amortized to those steps and becomes negligible. Additionally, to avoid handling more physical blocks, the physical blocks that are not touched by any particles are marked and skipped during the grid computations. In some experiments described below, when the number of particles is small, i.e., 55.3 K, the rebuild-mapping itself is the bottleneck, and the free zone scheme alone brings 3.7 times acceleration.

In some embodiments of the present disclosure, particle sorting is implemented as further described below. In the particle-to-grid step, particles in the vicinity could simultaneously write to the same grid nodes, leading to writing conflicts. The simplest way to enforce correctness is to use CUDA atomic operations. However, the performance of using CUDA atomic operations can be severely compromised without careful treatment. Two different types of solutions have been implemented to reduce the total number of atomics at any instant. A first method either leaves particles unsorted at the cell level or adjusts their orders with shuffling or binning strategies, such that particles within the same warp would have a smaller chance to conflict. On the contrary, in a second method, sorting particles to cells and then applying a warp-level reduction to fuse multiple atomic operations into one are implemented herein in this disclosure as it is more robust towards extreme scenarios. For example, when particles get tightly compressed into one cell, the first method would fail to alleviate conflicts.

In some embodiments, in a CUDA warp, 32 threads handle 32 particles in parallel. When particles are randomly ordered, the 32 threads would have a better chance to write to different grid nodes at one instant. However, as particles are sorted into cells, several subgroups usually exist among the 32 particles. threads inside each subgroup write to the same node. Reductions are independently conducted per subgroup, and then the first thread in each subgroup is responsible for writing the reduced result back to the grid node. In this way, each subgroup ends up with only one atomic operation.

A complete particle sorting can be divided into two phases: sorting particles with respect to particle blocks and then sorting with respect to cells. Sort particles with respect to particle blocks is modified to be compatible with the free zone, i.e., as long as the particles stay inside the free zone, there is no need to sort particles into blocks.

Furthermore, as the reduction only helps to lessen atomic operations within each warp, instead of sorting with respect to cells every time step, sorting with respect to cells can be performed only when rebuild-mapping happens. Between two rebuild-mappings, radix-sort is conducted in each warp before the reduction in P2G transfer. This arrangement splits sorting with respect to cells are further divided into two sub-steps: sorting in each warp and then sorting between warps, and the latter can be avoided in most time steps.

In some embodiments, instead of using 32 bits for warp-level radix-sort, only 10 bits are needed for better efficiency as the free zone spans a domain with $(10dx)^3$.

The methods and systems disclosed herein may present a less optimal particle ordering, e.g., particles in the same cell can be distributed to several warps, resulting in several atomics instead of one. However, this performance loss can be compensated well when particle density is not extremely high in each cell. The complete particle sorting is avoided, which may possess quite a fraction of the whole process, leading to 8%-17% acceleration across different resolutions.

In some embodiments of the present disclosure, particle sorting is implemented, and non-native atomics is avoided, which is further described below.

In some examples, two types of atomic operations are adopted in the P2G step. Values such as the weighted momenta transferred from particles to grid nodes are first added up in the shared memory by non-native atomics to get intermediate results. Then they are written back to the global memory through native atomics to reach the final results.

However, non-native atomics is much slower than the native ones as they are not supported by the (latest generation of) hardware. Atomics of floating-point numbers performed on the shared memory are emulated by a read-modify-write (RMW) operation using the atomicCAS instruction.

Figure 2:
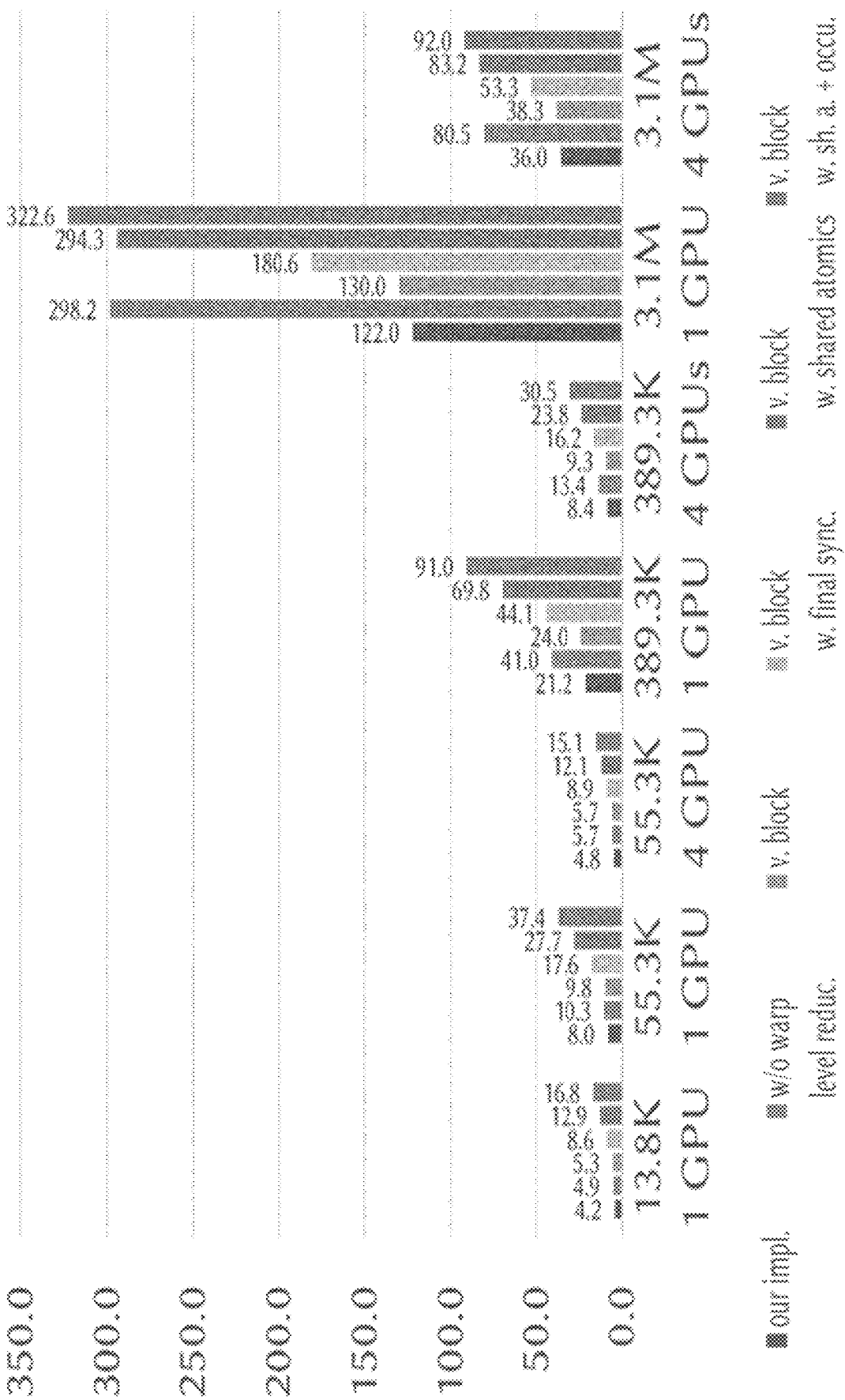
FIG. 2 illustrates a timing comparison with different number of GPU(s) and different number of particles contained in the simulation, between the present implementation and several other methods, in accordance with some implementations of the present disclosure.

FIG. 2 illustrates a timing comparison with different number of GPU(s) and different number of particles contained in the simulation, between the present implementation and several other methods, in accordance with some implementations of the present disclosure. The other figures in the present disclosure also show simulations with different number of GPU(s) and/or different number of particles, which may not be repeated later. Specifically, FIG. 2 shows the timing (in milliseconds) comparison between the present implementation (shown as "our impl."), the method without a warp level reduction (shown as "w/o warp level reduc."), the method using a virtual block (shown as "v. block"), the method using a virtual block and having an intra-block synchronization at the end of P2G (shown as "v. block w. final sync."), the method using a virtual block with shared memory atomics (shown as "v. block w. shared atomics"), and the method using a virtual block with the shared memory atomics and higher occupancy (v. block w. sh. a.+occu.). As shown in FIG. 2, the present implementation disclosed herein uses less time.

Figure 3:
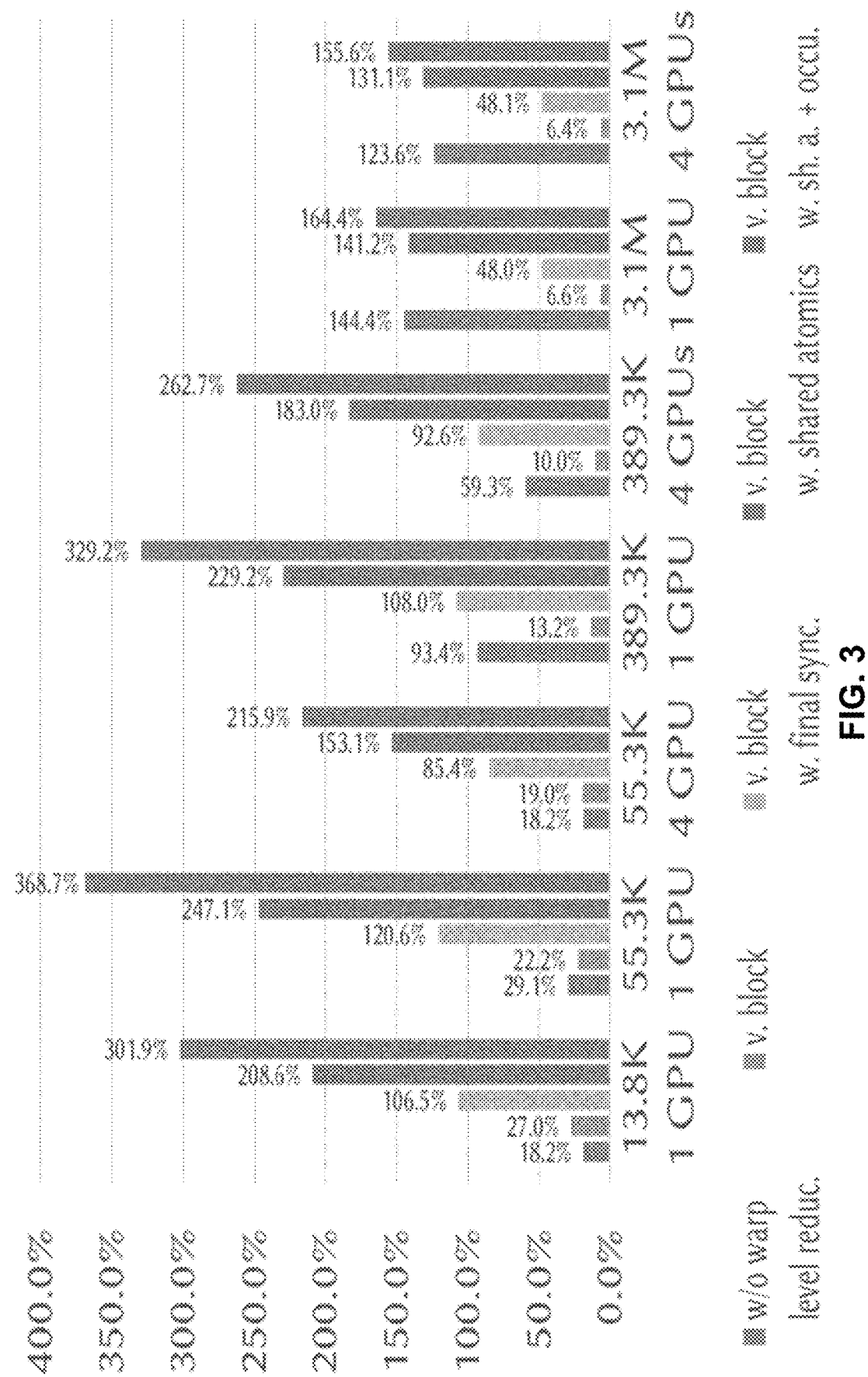
FIG. 3 illustrates the percentage of additional costs incurred by several other methods with different number of GPU(s) and different number of particles contained in the simulation, relative to the present implementation, in accordance with some implementations of the present disclosure.

FIG. 3 illustrates the percentage of additional costs incurred by several other methods with different number of GPU(s) and different number of particles contained in the simulation, relative to the present implementation, in accordance with some implementations of the present disclosure. As shown in FIG. 3, the present implementation disclosed herein uses less cost.

In some examples, the adoption of shared atomics also imposes constraints that may contradict the present rebuilding mapping scheme. The shared memory needs to be sufficiently large to store the data of all the nodes with which the particles in a block may interact. However, as the streaming multiprocessor (SM) has a limited size of shared memory, kernels using a large shared memory will be executed with fewer active CUDA blocks. To make the required shared memory size acceptable, some method limits the size of neighboring blocks as 2×2×2 and require each CUDA block only to handle the particles from a specific grid block. Instead, the present rebuilding mapping scheme uses 3×3×3 neighboring blocks, which requires a shared memory size that significantly reduces the number of active CUDA blocks, leading to a performance loss.

To avoid non-native atomics and the above issues, the global memory is directly written back via native atomics when computing the transfers from one particle to one grid node. As shown in FIGS. 2 and 3, 3×-5× acceleration is achieved. Additionally, 3×3×3 blocks are now compatible with the free zone without fretting the memory size limitation. The multiprocessor occupancy is also improved by allowing a CUDA block to handle warps from different particle blocks. Furthermore, there is no need to synchronize threads before writing from the scratchpad to the global memory anymore. The warps that finish their work sooner do not have to stall but immediately switch to new tasks.

Similarly, in some embodiments, the shared memory in the G2P step is not used.

In some embodiments of the present disclosure, Material Point Method on multiple GPUs is further described as follows. In multi-GPU applications, the efficiency is defined as $$e = \frac{t_1}{n \times t_n} \quad (1)$$

where $t_1$ and $t_n$ are the time consumed with only one GPU and with n GPUs respectively. In general, e≤1, where e only reaches 1 (or 100%) in the ideal case. n-GPUs produce n-times performance scaling, making $$t_n = \frac{t_1}{n}.$$

The closer e gets to 1, the better a multi-GPU implementation/algorithm would be. As the first effort of optimizing MPM on multiple GPUs, some method built up a working process from scratch and delivered good performance. In some embodiments, several new schemes are adopted herein that successfully improve the efficiency of the present process closer to the ideal case.

Figure 4:
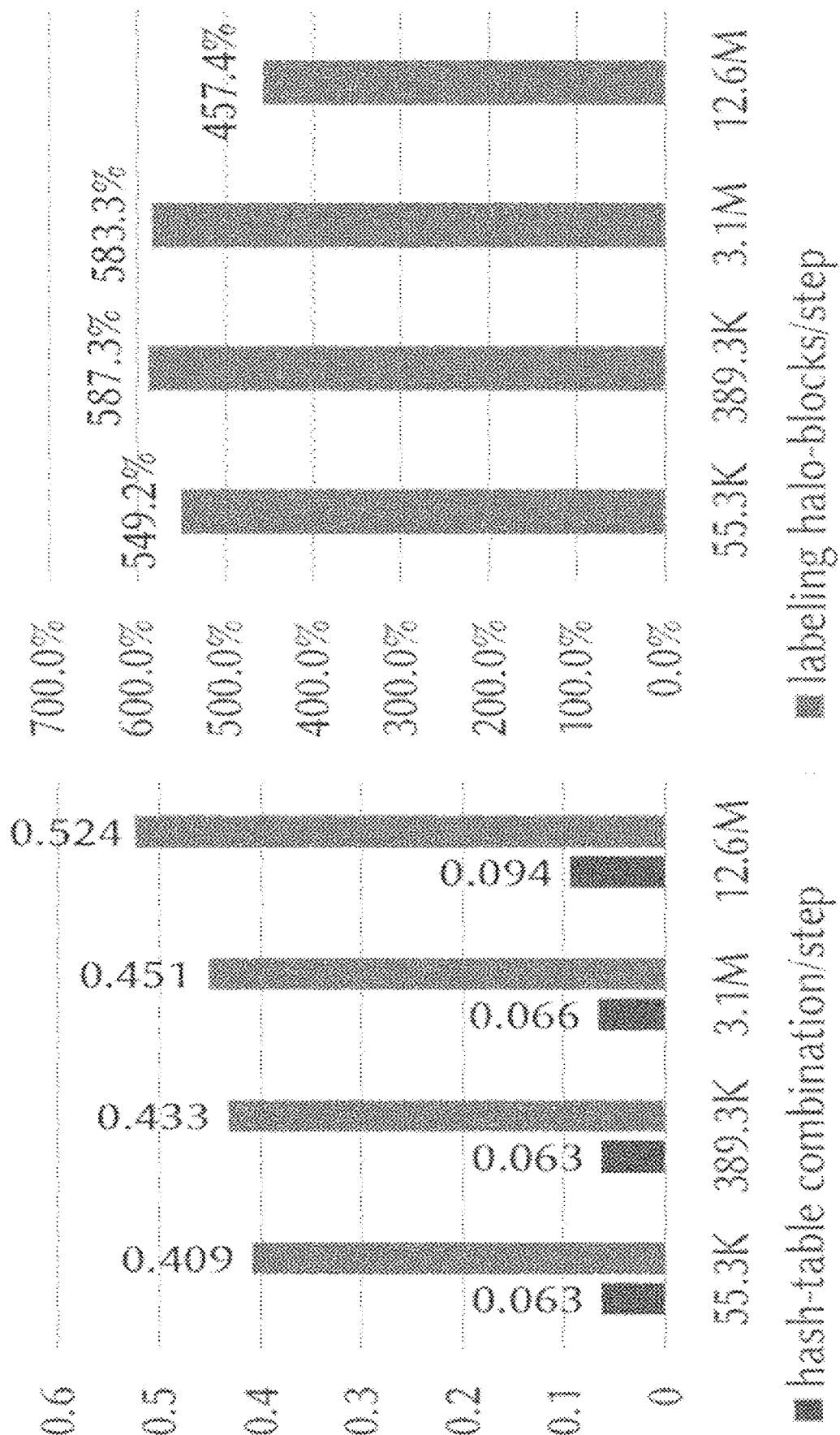
FIG. 4 illustrates performance comparison with different number of particles contained in the simulation, between the present lightweight hash-table combination implementation and the halo-blocks' labeling method, in accordance with some implementations of the present disclosure.

In some embodiments of the present disclosure, tagging shared and non-shared blocks is further described below. FIG. 4 illustrates performance comparison with different number of particles contained in the simulation, between the present lightweight hash-table combination implementation and the halo-blocks' labeling method, in accordance with some implementations of the present disclosure. The left graph of FIG. 4 shows the timing (per step, in milliseconds) comparison between the present lightweight hash-table combination method and the halo-blocks' labeling method. The right graph of FIG. 4 shows the percentage of additional costs incurred by the halo-blocks' labeling, relative to the present lightweight hash-table combination implementation. This test involves 4 GPUs for all the scenarios.

In some method, a block is tagged into three different types, assigned blocks in which particles reside, transferred block to which the particles may write, and advected blocks to which particles may advect. Based on this tagging, the "halo regions" containing overlapping blocks on two or more cards are also identified. Instead of using such a sophisticated scheme, in this disclosure, a much simpler scheme is adopted that is far less time-consuming.

In some embodiments, blocks are tagged into two types: blocks shared by other GPUs and blocks not shared by any GPUs. Blocks with the latter type can be processed similarly as blocks on a single GPU, while shared blocks also need a pass of data reduction after P2G transfer. To identify the shared blocks, a list storing all the block codes on each GPU during the construction of the hash table is maintained. An inter-GPU synchronization is enforced right before the tagging to guarantee that the code lists from all GPUs are in place. Then each GPU reads block codes from other GPUs via peer-to-peer (P2P) read operation, and computes their spatial indices through block codes. For each incoming block, then whether its code already exists in the local hash table is checked. If so, both its source GPU ID and memory address are recorded for later reduction. As P2P read is adopted, on each GPU, the tagging step is entirely independent of all other GPUs, i.e., after the tagging step, each GPU can move forward without triggering a second inter-GPU synchronization that may stall the devices.

Figure 5:
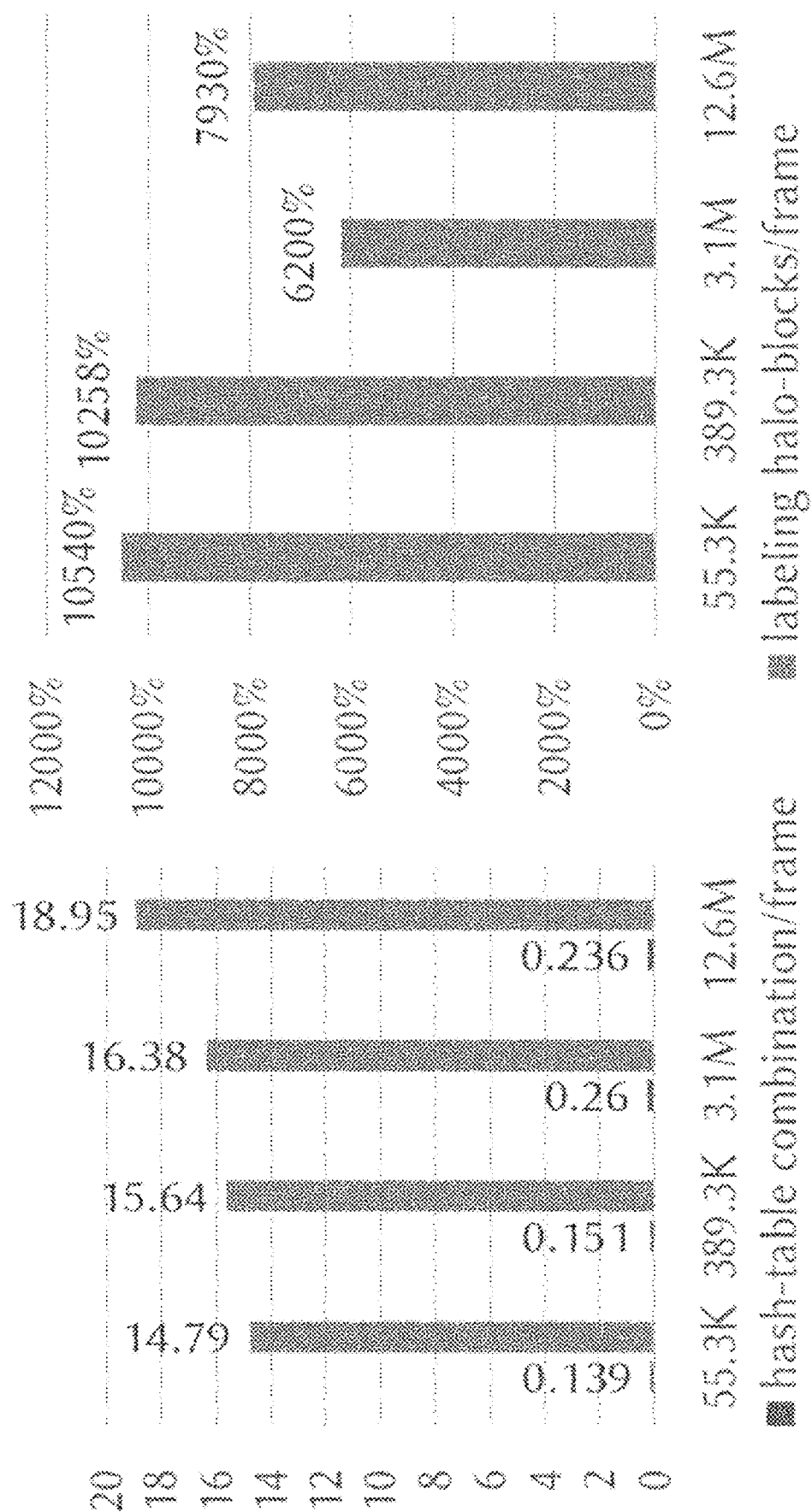
FIG. 5 illustrates performance comparison with different number of particles contained in the simulation, between the present lightweight hash-table combination implementation and the halo-blocks' labeling method, in accordance with some implementations of the present disclosure.

FIG. 5 illustrates performance comparison with different number of particles contained in the simulation, between the present lightweight hash-table combination implementation and the halo-blocks' labeling method, in accordance with some implementations of the present disclosure. The left graph of FIG. 5 shows the timing (per frame, in milliseconds) comparison between the lightweight hash-table combination implementation and the halo-blocks' labeling method. The right graph of FIG. 5 shows the percentage of additional costs incurred by the halo-blocks' labeling method, relative to the present lightweight hash-table combination implementation. This test involves 4 GPUs for all the scenarios.

In some method, tagging is conducted by copying data through cudaMemcpy both between GPU and CPU and between GPUs along with multiple CPU-GPU and inter-GPU synchronizations. On the contrary, the method disclosed herein is relatively lightweight and only requires one inter-GPU synchronization, leading to 5× acceleration per step as shown in FIG. 4. Due to the present free-zone scheme as described above, this tagging step is conducted only when rebuild-mapping happens (while transfers among GPUs are still performed every time step), which tremendously reduces the cost per frame as demonstrated in FIG. 5.

In some embodiments of the present disclosure, computing reduced sum on shared blocks is further described blew. For each time step, as the values on the nodes of shared blocks are distributed to different cards, a reduction operation has to be applied across multi-GPUs to get the correct nodal values. A method that is both lightweight and quite efficient is implemented herein.

In some embodiments, for collecting nodal values stored on shared blocks from different GPUs, all the GPUs are synchronized right after the P2G step, as peer-to-peer read operation will be used in the reduction step. This operation is the only inter-GPU synchronization required in each step, if the rebuilding mapping is not initiated. The reduction is further fused with the original nodal computations (i.e., updating nodal velocities and resolving collisions) into a single kernel to overlap the inter-GPU communications and the local computations through warp scheduling, thus providing better performance.

In some embodiments, to ensure each GPU proceeds independently and to avoid data race, a double buffer strategy is adopted to isolate the local reduction on each GPU. Specifically, two buffers are allocated for the P2G transfer and inter-card reduction. The results are stored from each GPU's P2G on the second buffer. For each shared block, the copies of this block are then read from other GPUs' second buffer via P2P-reads, they are added together with the local copy, and the sum is stored to the first buffer of the current GPU. In this process, each GPU's P2G results are kept (which are stored in the second buffer) untouched so that any other cards would be able to read its original value via P2P reads.

The method disclosed herein effectively conducts multiple reductions for the same shared pblock. An alternative is to reduce once on a single GPU and then copy the values to other GPUs via P2P atomic writes. However, inter-card atomics with a large portion of data needs many (implicit) synchronizations between GPUs, which can be very ineffective. Additionally, such an alternative introduces an extra post-write synchronization to inform all other cards to move forward, leading to less efficiency.

Similar to the case of a single GPU, as the present free zone scheme introduces more blocks than required for each single time step, there are more P2P transfers than needed. To alleviate this issue, the transfers are skipped from the marked blocks that are not touched by particles on the source GPU in the current time step.

The methods and systems disclosed herein have many advantages.

In some embodiments, the machine used to run the benchmarks is an NVIDIA DGX-1. While there are eight Tesla V100 GPUs in total, they are divided into two groups, and only the GPUs in the same group have fully connected NVLinks. As a result, up to four GPUs in the same group are tested. The DGX-1 has two Intel Xeon Platinum 8255C CPUs running at 2.50 GHz, and each of them has 24 logical cores and 48 threads. The operating system is CentOS 7, the GPU driver version is 460.32.03, and the CUDA version is 11.2.

In some embodiments, the tests for the present implementations begin with a sand scenario. With the fixed cell size dx, one, four, or sixteen boxes of sand particles are dropped into a container such that the particles collide with the frictionless boundary and with each other to generate energetic dynamics. 60 frames are simulated, and each frame has a duration of $\frac{1}{48}$ seconds. The time step size is fixed to $5.787 \times 10^{-4}$ seconds such that each frame consists of 36 time-steps. The average cost per frame across the entire 60 frames is reported. For the multi-GPU tests, the longest axis of the particle cluster is computed and the particles along with this axis is sorted. Then the particles are divided by their indices and distribute them evenly onto four GPUs.

Figure 6A:
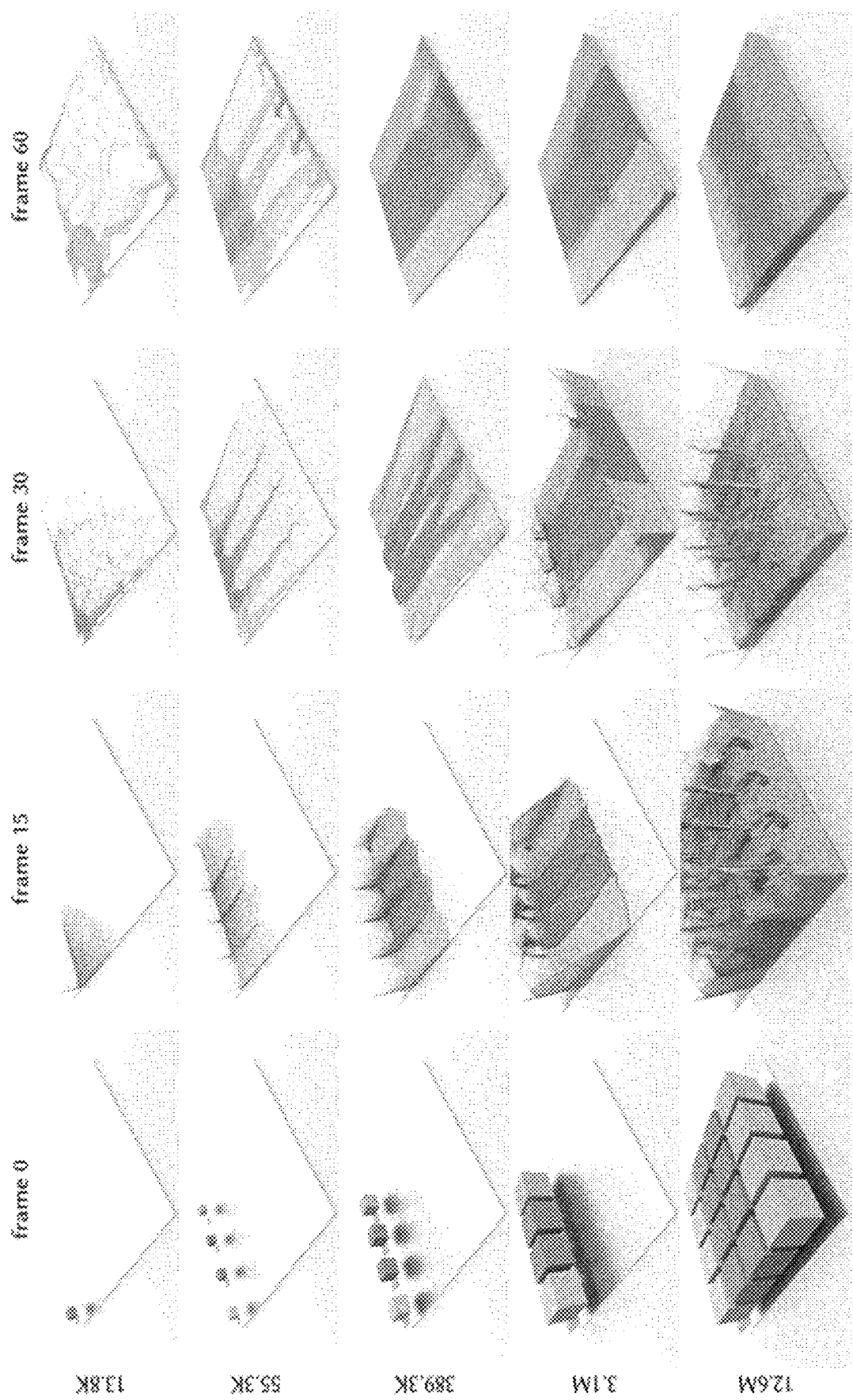
FIG. 6A illustrates that the blocks of sand with different sizes are dropped into a static, frictionless box, where particle blocks from left to right are simulated with different GPUs, in accordance with some implementations of the present disclosure.
Figure 6B:
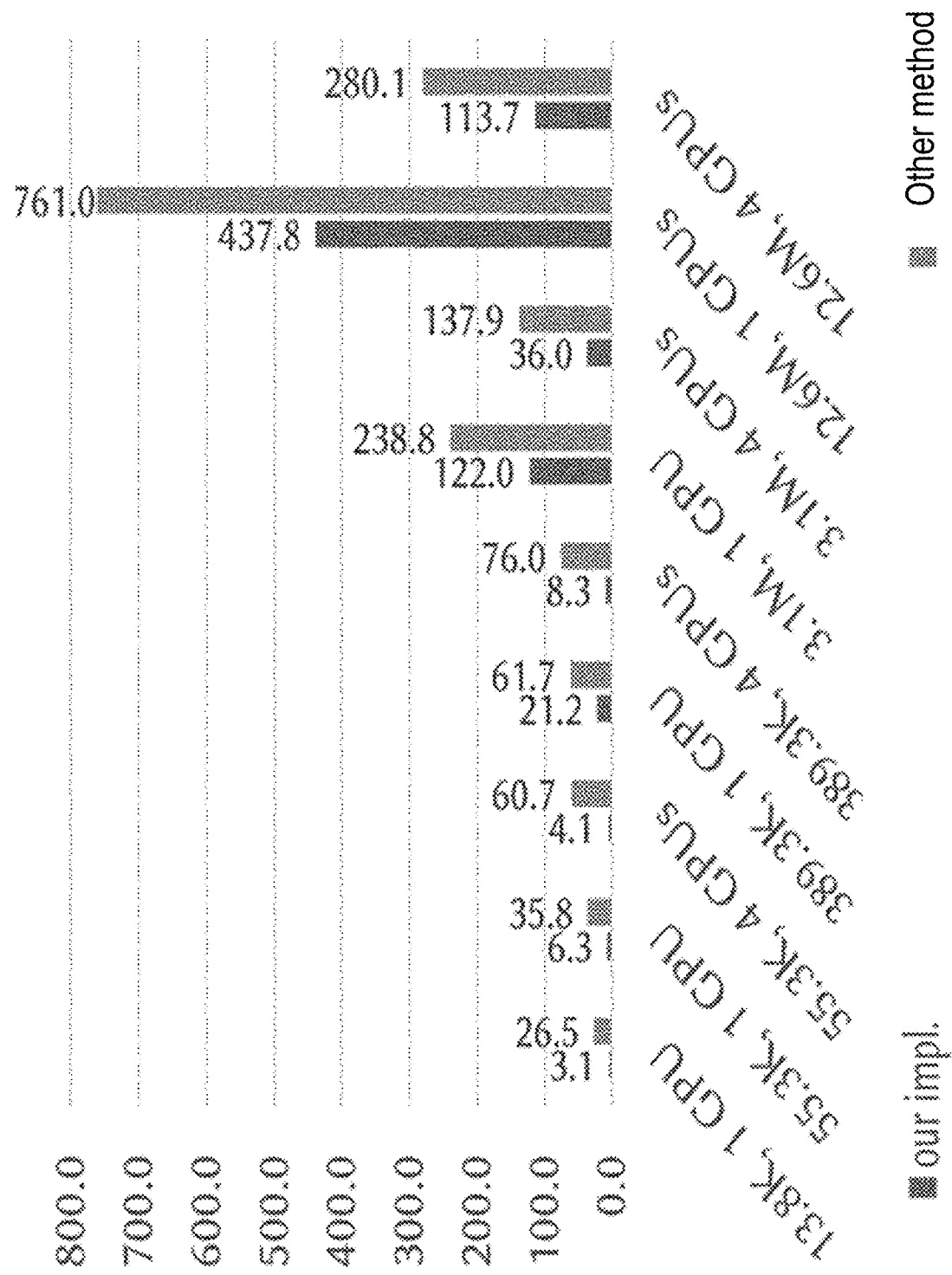
FIG. 6B illustrates the timing per frame comparison between the present implementation and another state-of-the-art method with different number of GPU(s) and different number of particles contained in the simulation, in accordance with some implementations of the present disclosure.
Figure 6C:
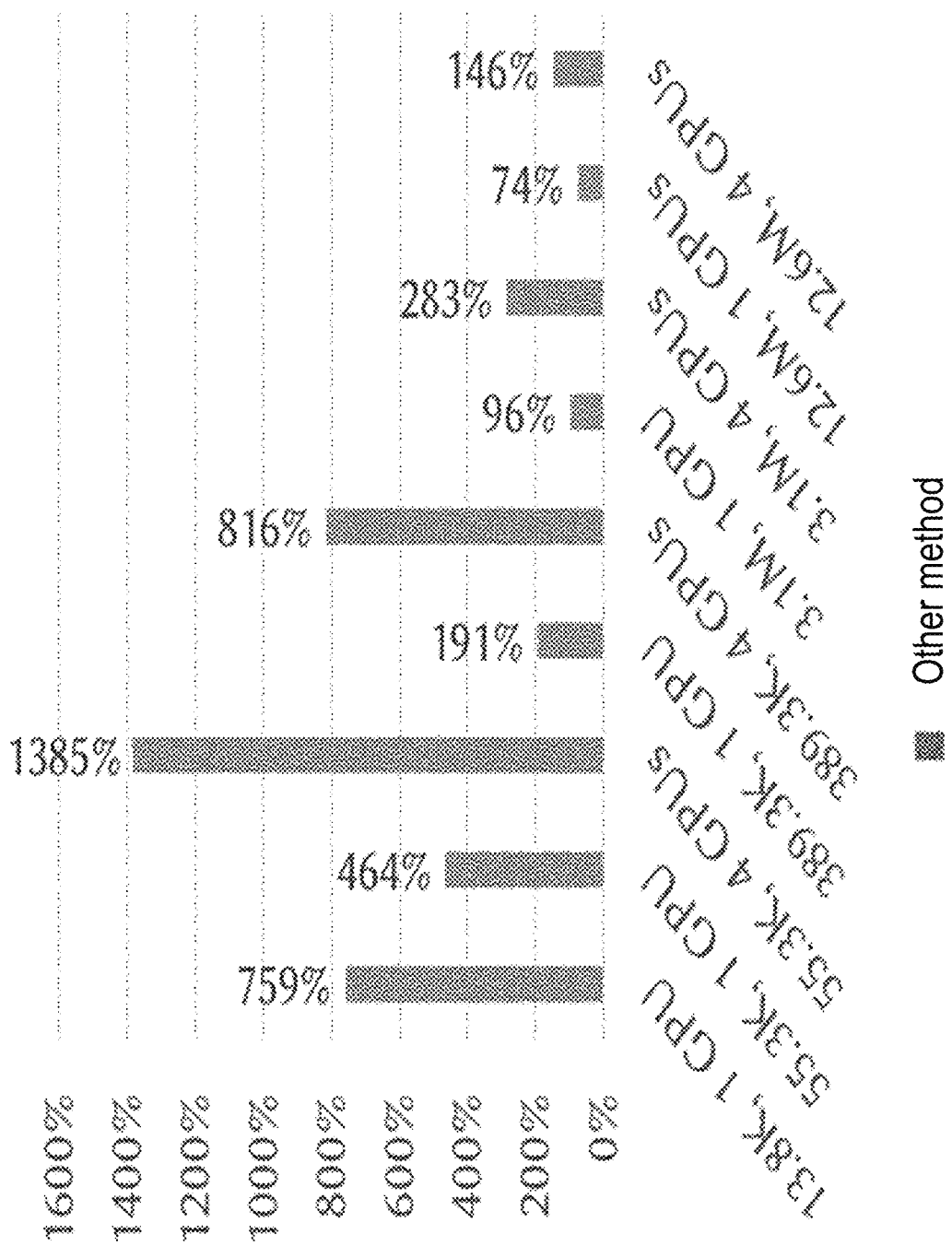
FIG. 6C illustrates the other state-of-the-art method's percentage of additional costs per frame compared with the present implementation, in accordance with some implementations of the present disclosure.
Figure 6D:
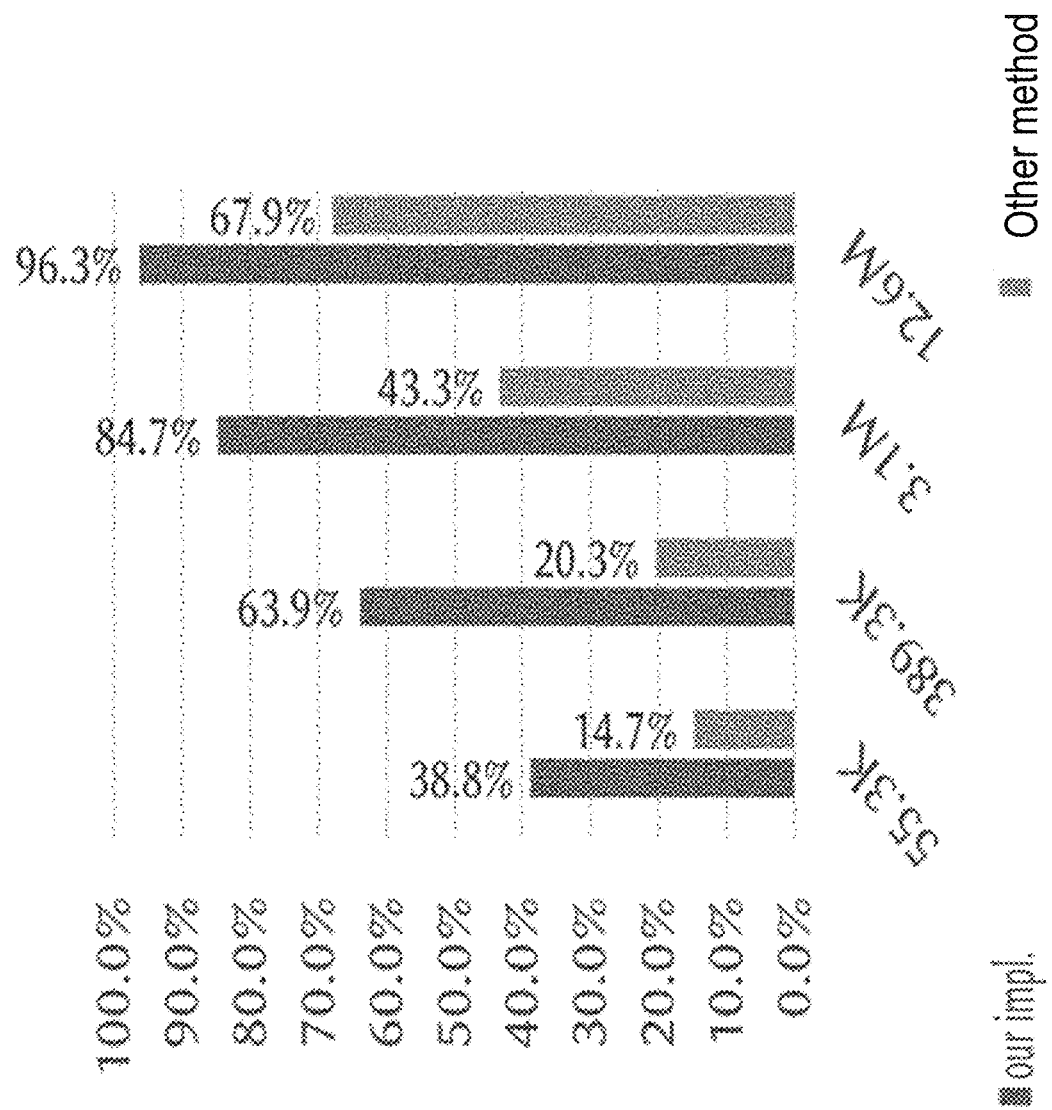
FIG. 6D illustrates the comparison of 4-GPUs' efficiencies computed through equation (1) from the averaged timings between the present implementation and the other state-of-the-art method with different number of particles contained in the simulation, in accordance with some implementations of the present disclosure.

FIG. 6A illustrates that the blocks of sand with different sizes are dropped into a static, frictionless box, where particle blocks from left to right are simulated with different GPUs, in accordance with some implementations of the present disclosure. FIG. 6B illustrates the timing per frame (in milliseconds, averaged over 60 frames) comparison between the present implementation and another state-of-the-art method (shown and referred to as "other method") with different number of GPU(s) and different number of particles contained in the simulation, in accordance with some implementations of the present disclosure. FIG. 6C illustrates the other state-of-the-art method's (shown and referred to as "other method") percentage of additional costs per frame compared with the present implementation, in accordance with some implementations of the present disclosure. FIG. 6D illustrates the comparison of 4-GPUs' efficiencies computed through equation (1) from the averaged timings between the present implementation and the other state-of-the-art method (shown and referred to as "other method") with different number of particles contained in the simulation, in accordance with some implementations of the present disclosure. The final process of the present implementation delivers a massive boost in performance compared to state-of-the-art methods.

As shown in FIGS. 6B-6D, the final process of the present implementation is compared with another state-of-the-art method. As shown in FIGS. 6B-6C, the other method consumes much more time than the present implementation, ranging from 96% to 1385%. The present process is exceptionally faster than the other method when the number of particles on each GPU is small.

In some embodiments, as shown in FIG. 6D, the 4-GPU efficiencies (the capability of scaling) between the final process of the present implementation and the other state-of-the-art method are compared. The efficiency e through equation (1) is computed from the averaged timings. The multi-GPU process of the present implementation almost reaches the ideal case (i.e., $e \approx 1$) when the number of particles is large (96.3% for 12.6M) and keeps an acceptable efficiency when the number of particles is small (38.8% for 55.3K). On the contrary, the other method's efficiencies drop to less than 25% when the simulation contains less than 389.3K particles, indicating too much overhead in its multi-GPU process, and making its 4-GPU simulation even slower than their 1-GPU simulation. In some embodiments, G2P2G is adopted when the number of particles per GPU is less than 100K (with either multiple GPUs or a single GPU), while the instruction miss rate is still tolerable.

Figure 7A:
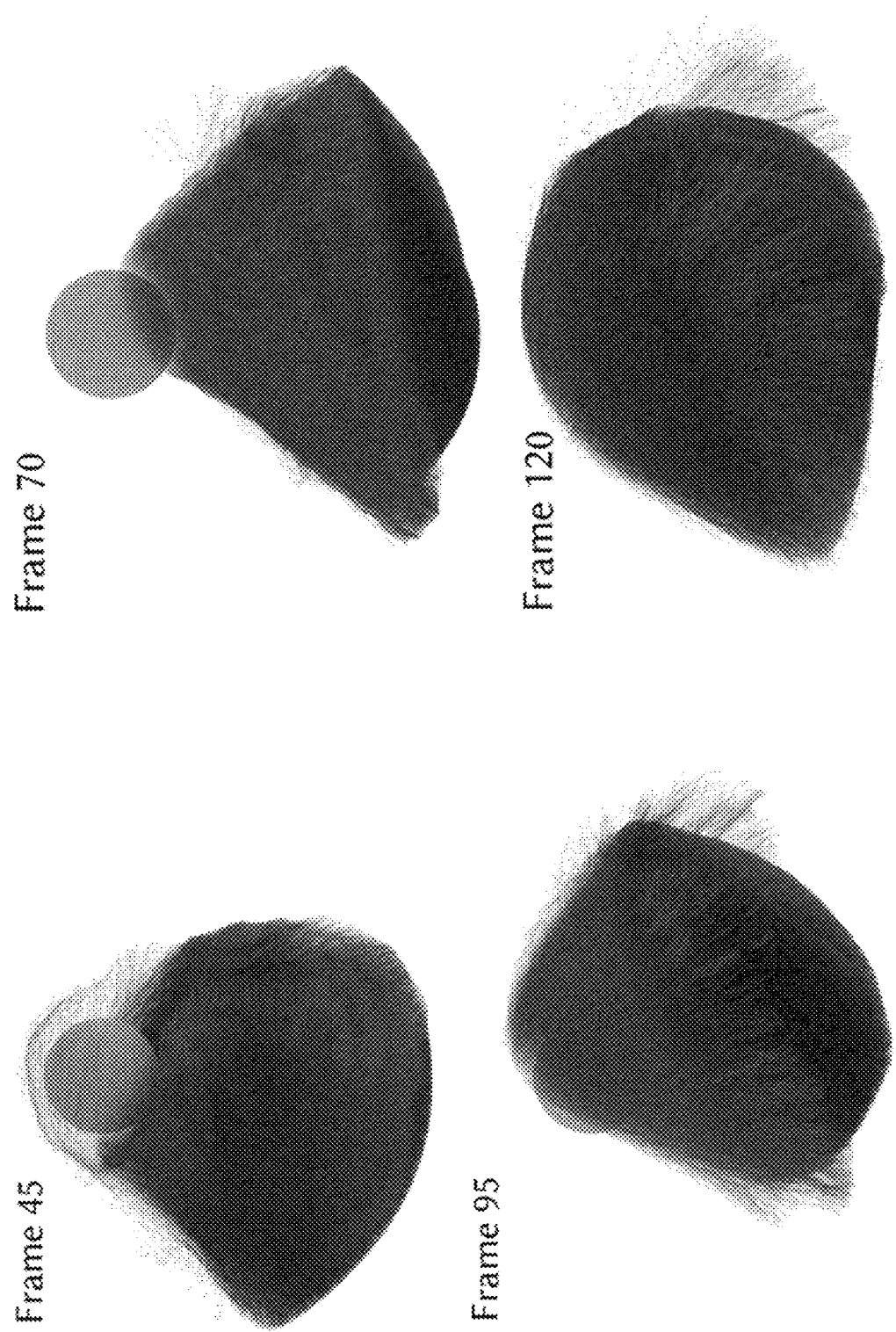
FIG. 7A illustrates a fast rotating sphere driving 64K hairs to flip, in accordance with some implementations of the present disclosure.
Figure 7B:
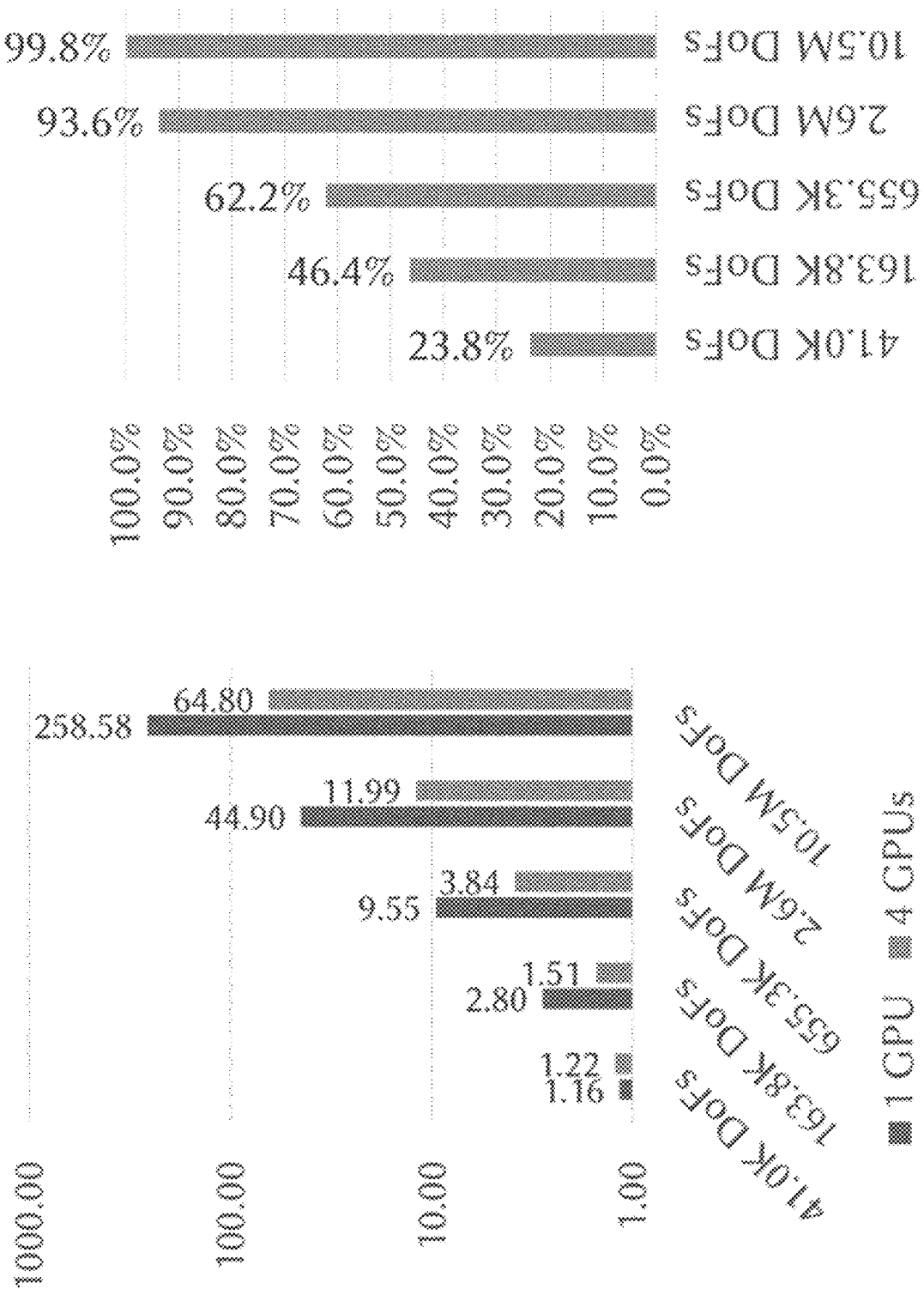
FIG. 7B illustrates the performance comparison between 1 GPU and 4 GPUs, in accordance with some implementations of the present disclosure.

FIG. 7A illustrates a fast rotating sphere driving 64K hairs to flip, in accordance with some implementations of the present disclosure. FIG. 7B illustrates the performance comparison between 1 GPU and 4 GPUs, in accordance with some implementations of the present disclosure. The left graph of FIG. 7B shows the timing statistics (in milliseconds) per frame ($\frac{1}{60}$ s) for different number of hairs when different number of GPUs (1 GPU and 4 GPUs) are used, where each hair contains 163 degrees of freedoms (DoFs). The total number of DoFs for the simulation is shown in FIG. 7B. The right graph of FIG. 7B shows 4-GPUs' efficiencies with different number of hairs contained in the simulation computed through equation (1) from the averaged timings.

In some embodiments, FIGS. 7A-7B show the improvements of the present implementation that are also applied to simulations beyond particles. The MPM process of the present implementation is used in the experiment for hairs, where the semi-implicit discrete elastic rods (DER) is solved to modify the particle velocity before performing the P2G transfer and adopt ASFLIP (an modified FLIP method, and FLIP is an extension to the particle-in-cell (PIC) method) for advection. Number-of-hair CUDA blocks are used to build and solve the equation. Each CUDA block contains threads greater than or equal to the maximal number of segments in a hair for building the equation. Since the left-hand side is a symmetric positive definite banded matrix with bandwidth 10, 32 threads are adopted in each CUDA block to perform a parallel LDLT solution for each hair. 256, 1K, 4K, 16K, and 65K hairs are tested, containing 41.0K, 163.8K, 655.3K, 2.6M, and 10.5M degrees of freedom, respectively. Each hair contains 41 vertices and 40 twisting angles, with length 30.48 cm. dx=2.0 cm is used for the MPM simulation. The simulation contains 175 frames, with each frame proceeding at 1/60 seconds. An adaptive step length is further adopted through Courant-Friedrichs-Lewy (CFL) condition, i.e., each step takes $dx/v_{max}$ seconds, where $v_{max}$ is the maximal velocity magnitude.

The process in the present implementation can simulate hairs in real-time (i.e., 60 frame per second (FPS)) in scenarios containing ≤4K hairs on either a single or four GPUs, and keep an interactive frame-rate (≈15 FPS) for 65K hairs on four GPUs. Additionally, the efficiency of the multi-GPU process in the present implementation increases with the number of DoFs, and reaches almost ideal (99.8%) for 64K hairs containing 10.5M DoFs as shown in FIG. 7B.

In some examples, the present process is compared with some alternatives. For the ease of experiment, the sand scenario is used, and the scheme that P2G and G2P are two separate steps for the two sets of ablation study is also used in the following sections.

In the following examples, the comparisons are based on simulations on a single GPU.

In some embodiments, the present process with the reduced rebuilding mapping as described above is compared with the process without the reduced rebuilding mapping.

Figure 8:
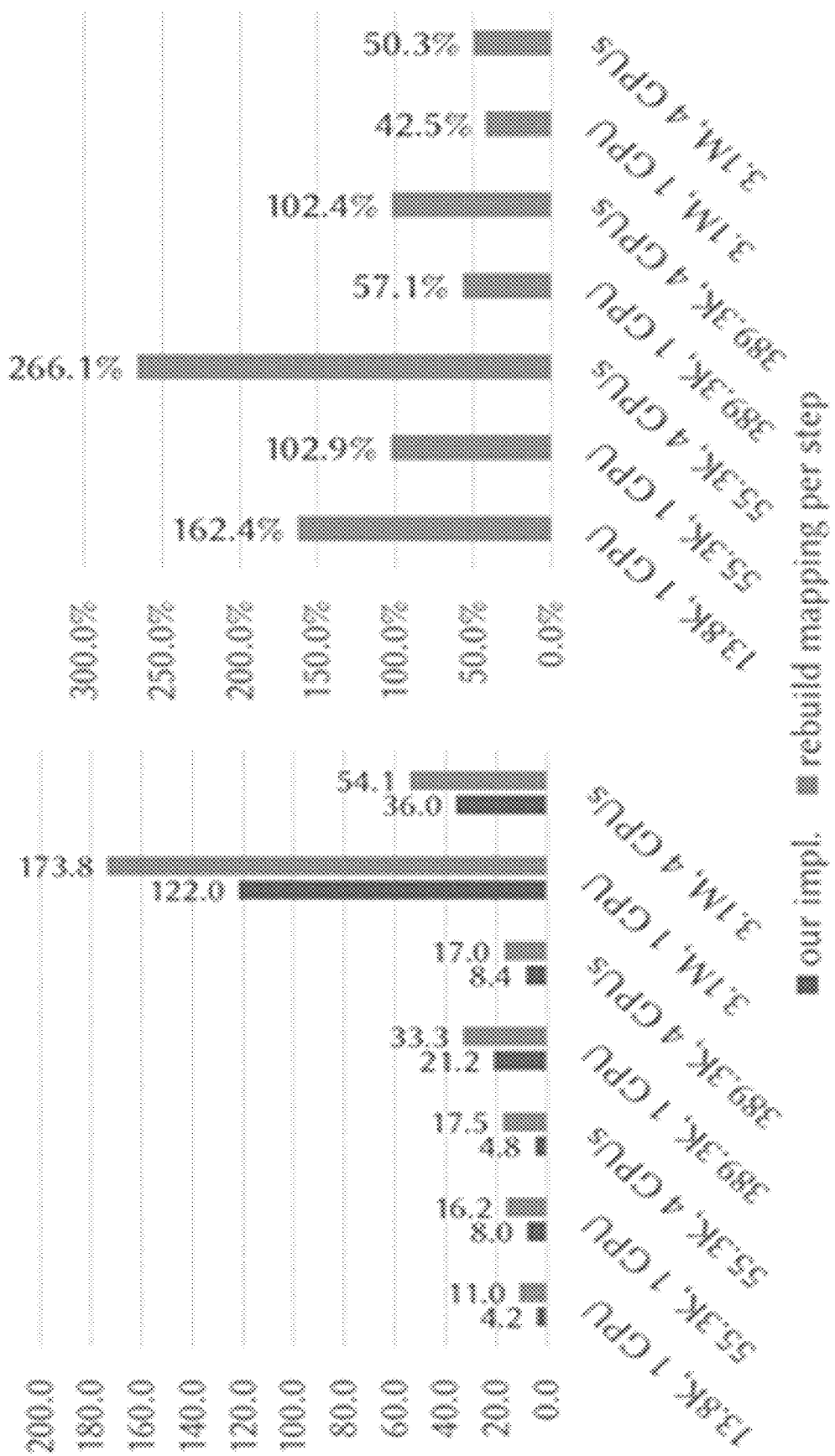
FIG. 8 illustrates a performance comparison between the present process including the reduced rebuilding mapping and a process without the reduced rebuilding mapping, in accordance with some implementations of the present disclosure.

FIG. 8 illustrates a performance comparison between the present process including the reduced rebuilding mapping and a process without the reduced rebuilding mapping, in accordance with some implementations of the present disclosure. The left graph of FIG. 8 shows the timing (in milliseconds) comparison between the present implementation (shown as "our impl.") and the one where mapping between the particle and the grid are rebuilt every step (shown as "rebuild mapping per step"). The right graph of FIG. 8 shows the percentage of additional cost incurred by rebuilding mapping per step, relative to the present implementation.

In some embodiments, the present scheme only rebuilds the mapping between particles and the background grid every 10 to 30 time steps (across all the test case' frames). When running with multiple GPUs, a standard rebuild-mapping step consists of more than ten CUDA kernels, CPU-GPU synchronizations, and inter-GPU synchronizations. In FIG. 8, it can be seen that without the present scheme, i.e., rebuilding the mapping every time step, the computational cost would increase by 42.5%-266.1% per frame.

In some embodiments, the present process with the reduced particle sorting as described above is compared with the processes without the reduced particle sorting.

Figure 9:
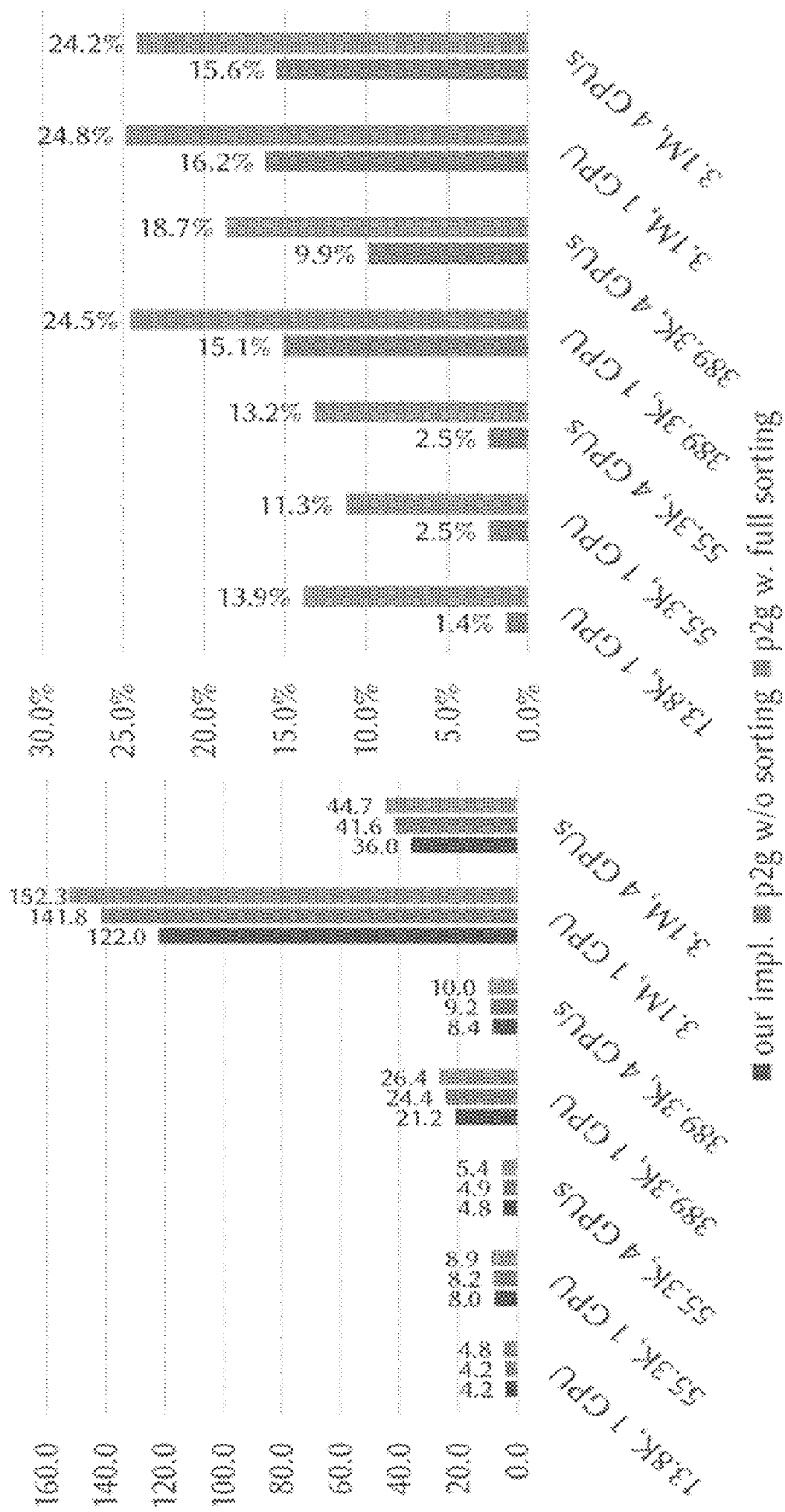
FIG. 9 illustrates a performance comparison between the present process including the reduced particle sorting, and processes without the reduced particle sorting, in accordance with some implementations of the present disclosure.

FIG. 9 illustrates a performance comparison between the present process including the reduced particle sorting, and processes without the reduced particle sorting, in accordance with some implementations of the present disclosure. The left graph of FIG. 9 shows the timing (in milliseconds) comparison between the current implementation (shown as "our impl."), the one without particle sorting (shown as "p2g w/o sorting"), and the one re-sorting all particles every step (shown as "p2g w. full sorting"). The right graph of FIG. 9 shows the percentage of additional costs incurred by not sorting and full re-sort, relative to the present implementation.

In some embodiments of the present process, a complete sort-particle step, i.e., sorting particles to cells, only occurs with the rebuild-mapping step. A warp-level radix sorting is used to help reduce the number of atomics in other time steps. In FIG. 9, two alternatives were compared with the present process. The first one gets rid of the warp-level radix-sort, leaving particles unsorted (p2g w/o sorting) for the time steps between two rebuild-mappings, and the cost per frame increases by 1.4%-16.2% compared to the present implementation. The second option conducts a complete sort-particle step every time step and introduces 11.3%-24.8% additional cost (p2g w. full sorting).

In some embodiments, the present process with the warp-level reduction as described above is compared with the processes without the warp-level reduction as shown in FIG. 2 and FIG. 3.

Figure 10A:
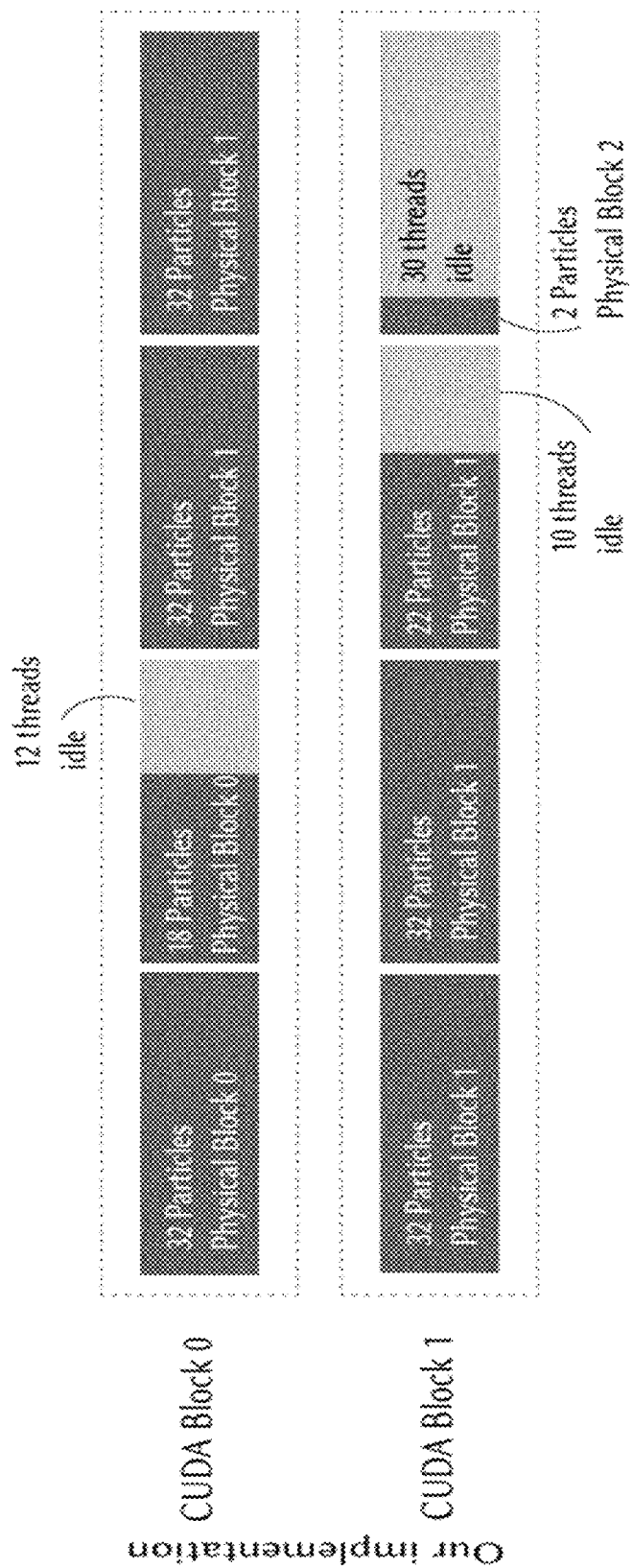
FIGS. 10A and 10B illustrate comparison between assigning a Compute Unified Device Architecture (CUDA) block to particles in mixed physical blocks and assigning to a unique virtual block, each of which only holds particles from a single physical block, in accordance with some implementations of the present disclosure.
Figure 10B:
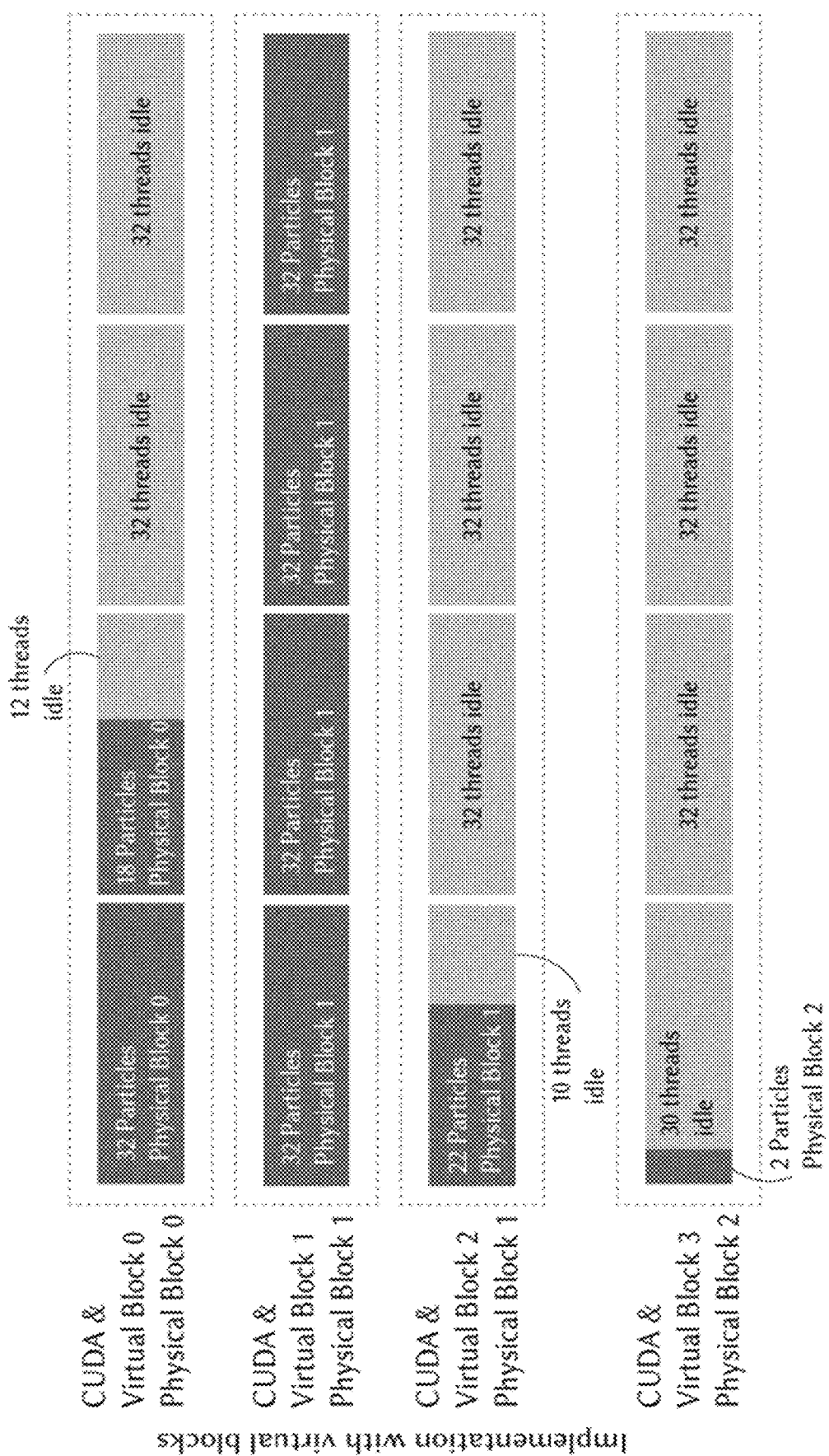

FIGS. 10A and 10B illustrate comparison between assigning a CUDA block to particles in mixed physical blocks (FIG. 10A) and assigning to a unique virtual block, each of which only holds particles from a single physical block (FIG. 10B), in accordance with some implementations of the present disclosure. The latter scheme, may have more CUDA blocks being launched and less efficient utilization of threads when the size of physical blocks varies. Here there are three physical blocks holding 50, 150, and two particles, respectively. A solid box indicates a CUDA warp with 32 threads, and a dashed box indicates a CUDA block with four warps.

In some embodiments, the present process with reduction on shared memory as described above is compared with the process without reduction on shared memory.

In some examples, two kinds of methods have been designed to handle the write conflicts in the P2G steps. One method adopts three levels of reductions: first, a warp-level reduction reduces the number of atomics within each warp; second, each warp writes the sums into the shared memory via shared atomics; and a syncthreads function synchronizes the threads in the CUDA block before the final reduction is applied to write to the global memory. Another method avoids the first reduction, and it shuffles particles such that there would be minimum conflicts within each warp. On the contrary, the second reduction is eliminated in the present process, which relies on the non-native shared atomics of floating-point numbers. In other words, after the warp-level reduction, the global memory is directly written to via global atomics without using the shared memory as the scratchpad. As shown in FIGS. 2 and 3, extensive comparisons are conducted between different schemes to show that the present scheme manifests the best efficiency.

Compared with the present scheme, partitioning particles into virtual blocks not only needs extra computations (6.4%-27.0% additional cost as in FIGS. 2 and 3, as "v.block"), but also introduces workload imbalance (FIGS. 10A and 10B) as virtual blocks would have many more idle threads. In some instances, virtual blocks from the same particle block will write to the same global memory addresses, potentially increasing the number of conflicts.

Reducing to the shared memory also requires an additional in-block synchronization which turns out to be quite expensive. Putting an extra synchronization at the end of the present implementation of P2G, (through Nsight Compute) the amount of warp stall barriers doubles can be observed. Such barriers prevent the warps from switching to handle another block of particles. As a consequence, the cost dramatically increases by 48.0%-120.6% per frame (FIG. 3, as "v.block w. final sync").

Furthermore, there do not exist native GPU instructions that support atomic addition for floating-point numbers on shared memory in most recent NVIDIA graphics cards. The compiler would translate the shared atomics into loops and atomic compare-exchanges as shown in FIG. 2. Such a translation would increase the number of instructions by 38% and further impact the computational performance. FIG. 3, "v. block w. shared atomics", shows there is 131.1%-247.1% additional cost when using both virtual blocks and shared atomics.

Finally, as the size of the shared memory in each CUDA block is relatively large in MPM, the GPU occupancy becomes much lower than the present implementation. Increasing the number of threads per block may help increase the occupancy but would not improve the performance. When the virtual block has a larger size, more threads stay idle for the particle blocks that do not have enough particles. In FIGS. 2 and 3, "v. block w. sh. a.+occu.", shows the situation deteriorates when increasing the number of threads per block from 128 to 256.

In some embodiments, the present process with spilling B-spline weight to the shared memory as described above is compared with the process without spilling B-spline weight to the shared memory.

Figure 11:
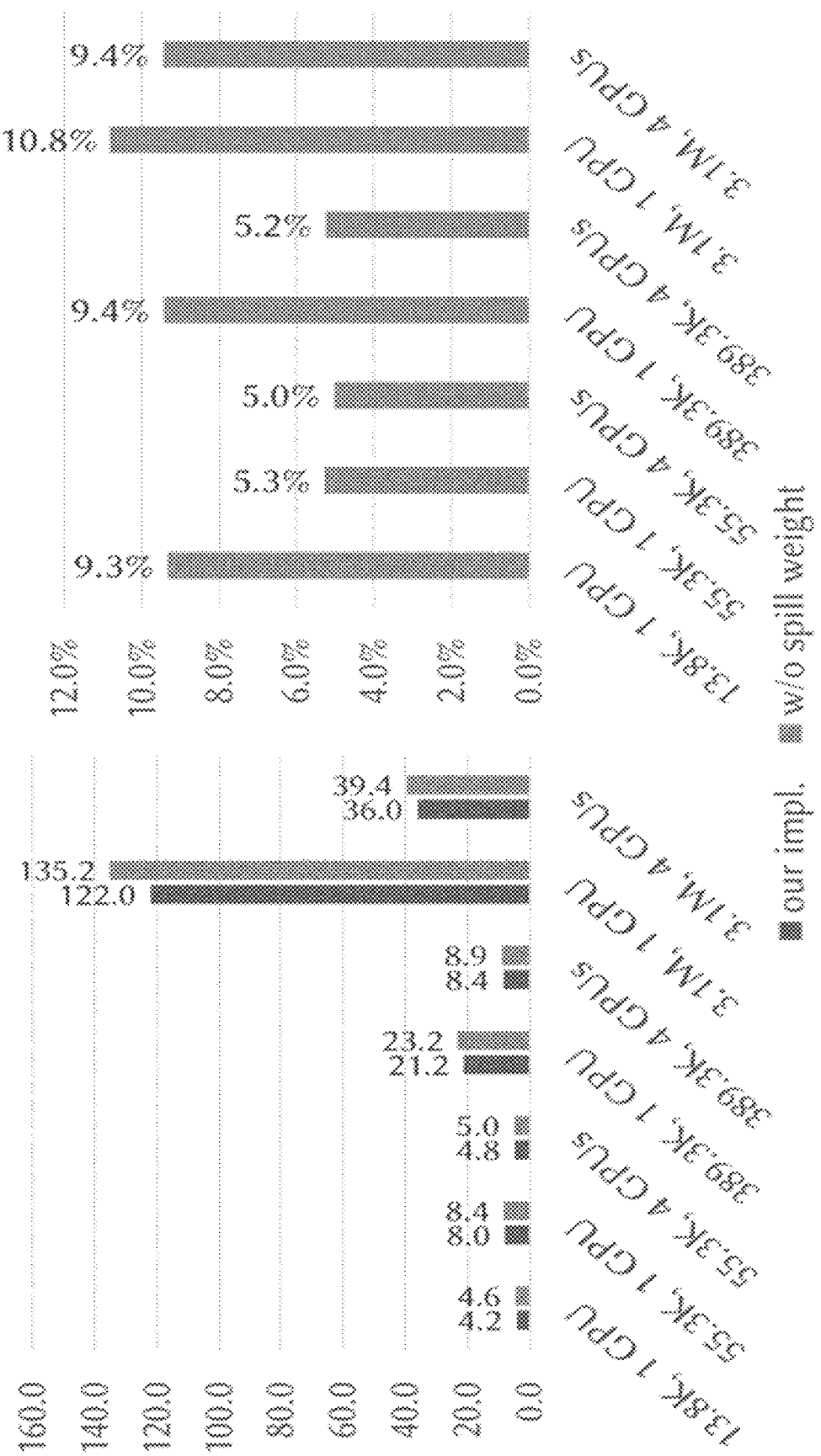
FIG. 11 illustrates a performance comparison between the present process including spilling B-spline weight to the shared memory and other process without spilling B-spline weight to the shared memory, in accordance with some implementations of the present disclosure.

FIG. 11 illustrates a performance comparison between the present process including spilling B-spline weight to the shared memory and other process without spilling B-spline weight to the shared memory, in accordance with some implementations of the present disclosure. The left graph of FIG. 11 illustrates the timing (in milliseconds) comparison between the present implementation and the one without spilling B-spline weight to the shared memory (shown as "w/o spill weight"). The right graph of FIG. 11 shows the percentage of additional costs incurred by not spilling, relative to the present implementation.

In some embodiments, register pressure needs to be reduced. For example, merging small kernels into large ones also means these large kernels consume a lot more registers, resulting in either register spilling or low occupancy. Instead of storing temporary results in registers, they are stored in shared memory to relieve register pressure. In FIG. 11, the performance of storing the B-spline weights in particle-grid transfer steps to either the shared memory or to the registers are compared, and the latter would bring in 5.0%-10.8% more costs as the occupancy gets decreased.

In some embodiments, the present process with Array-of-Structs-of-Array (AoSoA) data structure described below is compared with the process without AoSoA data structure.

Figure 12A:
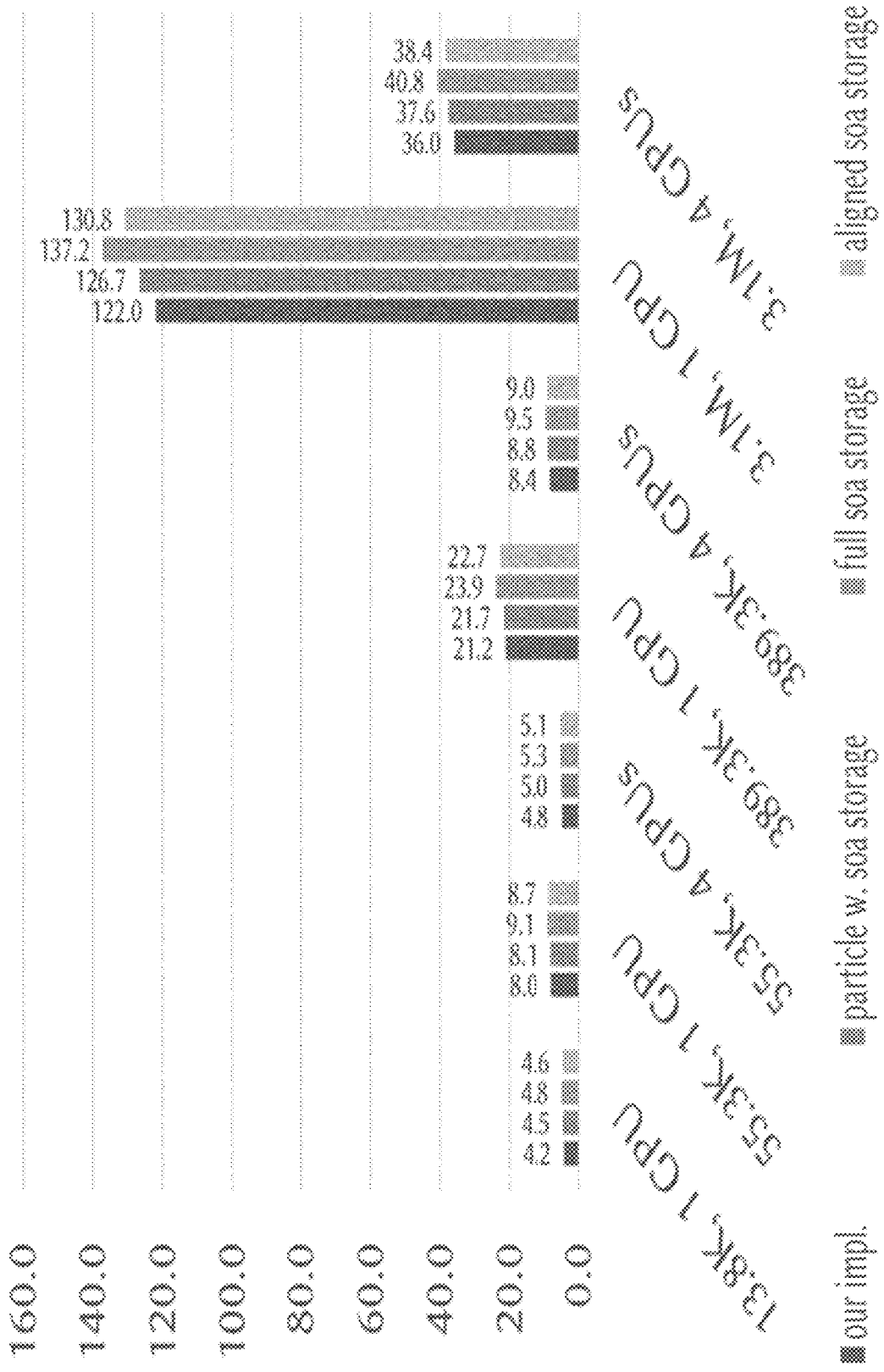
FIGS. 12A and 12B illustrate a performance comparison between the present process including Array-of-Structs-of-Array (AoSoA) data structure and other processes without AoSoA data structure, in accordance with some implementations of the present disclosure.
Figure 12B:
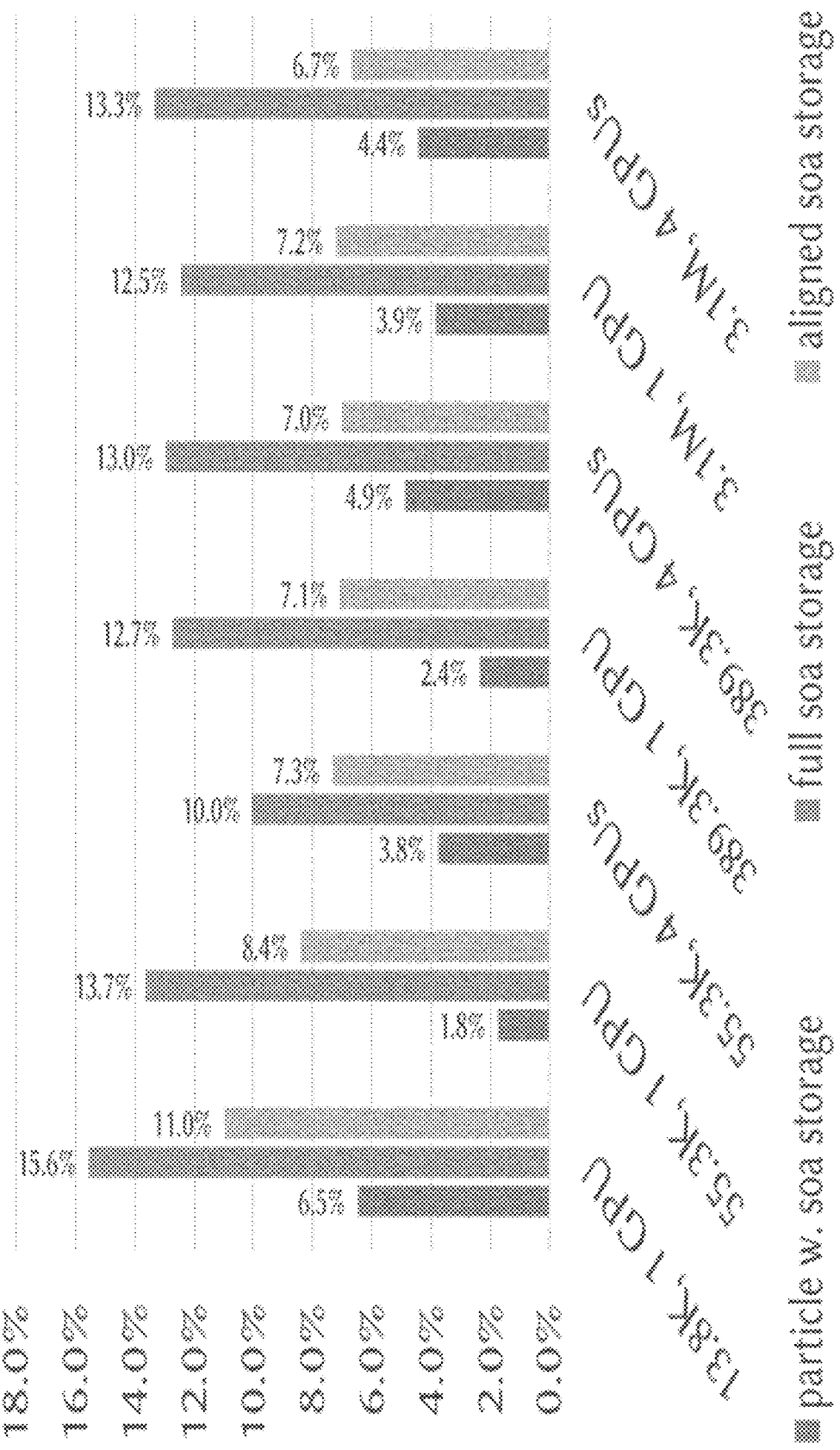

FIGS. 12A and 12B illustrate a performance comparison between the present process including AoSoA data structure and other processes without AoSoA data structure, in accordance with some implementations of the present disclosure. FIG. 12A shows timing (in milliseconds) comparison between the present implementation, the one that uses SoA for particle storage (shown as "particle w. soa storage"), the one that uses SoA for both particle and node storage (shown as "full soa storage"), and the one that uses SoA storage but aligned to 256 bytes (shown as "aligned soa storage"). FIG. 12B shows the percentage of additional costs incurred by the same other processes, relative to the present implementation.

In some embodiments, the Array-of-Structs-of-Array (AoSoA) data structure is used for storing properties on both the particles and the background grid. AoSoA is compared with the Structs-of-Array (SoA) data structure. As shown in FIGS. 12A and 12B, the SoA storage would introduce 6.7%41.0% additional cost per frame.

Memory requests in modern GPUs are fulfilled in fixed width (i.e., cacheline), and when requested data is not aligned with this width, more access operations are enforced to complete a request.

For example, when reading some data with the exact size of a cacheline, if this chunk of data is misaligned with the cacheline, two read operations are required instead of one, leading to less efficiency. AoSoA packs data into small 32×#channels packets, and thus the memory access pattern of AoSoA is well aligned to the cacheline. In contrast, SoA has less aligned requests and needs 8%-18% more sectors (and thus more data) sent/received than AoSoA.

Furthermore, at the end of P2G, when threads in the same warp write to different grid nodes, SoA presents a less coalesced pattern, i.e., accessing addresses within the same warp can be wildly different from AoSoA, leading to 16% more accesses.

In some embodiments, the present process with merging small kernels described below is compared with the processes without merging small kernels.

Figure 13A:
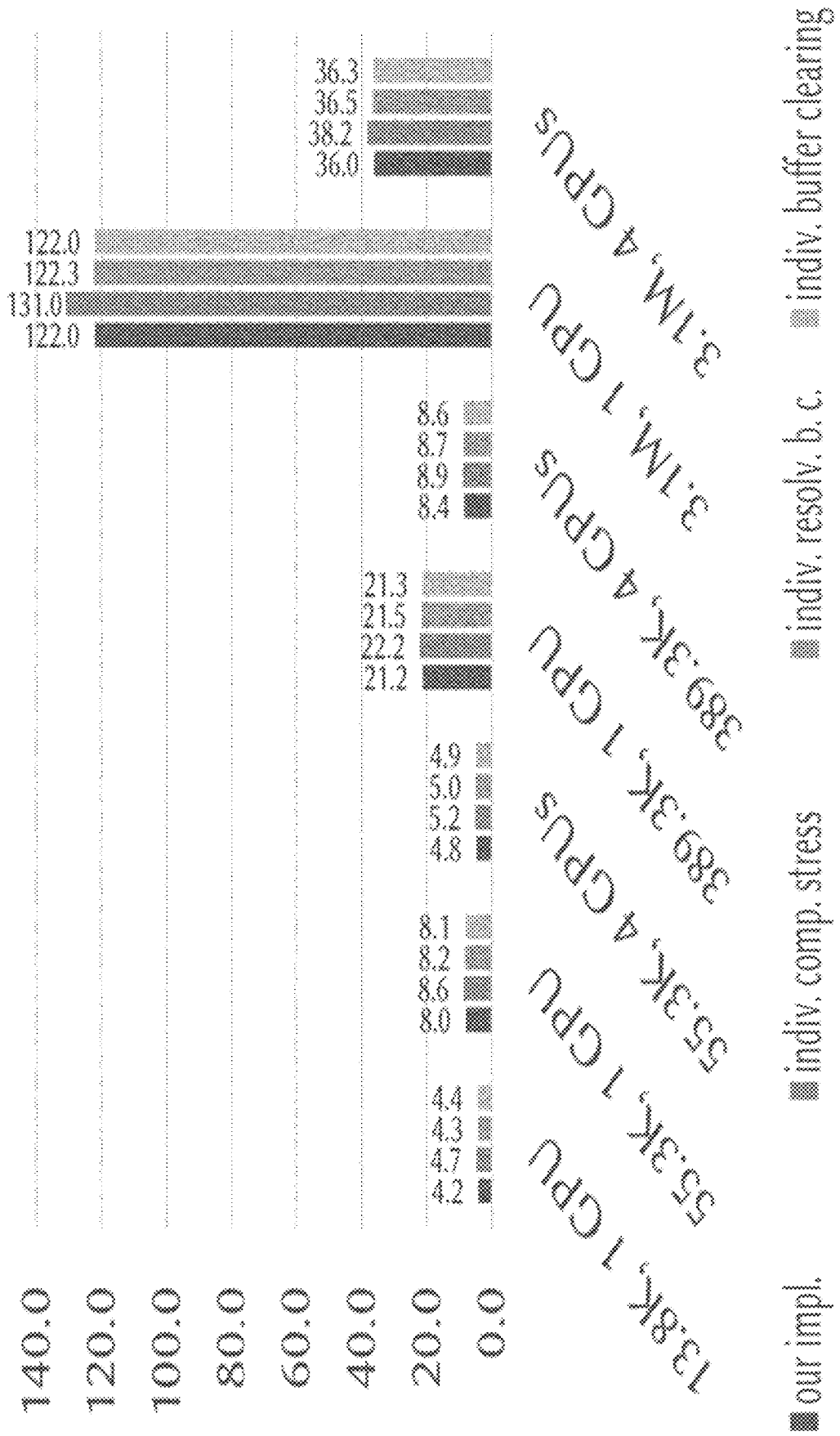
FIGS. 13A and 13B illustrate a performance comparison between the present process including merging small kernels and other processes without merging small kernels, in accordance with some implementations of the present disclosure.
Figure 13B:
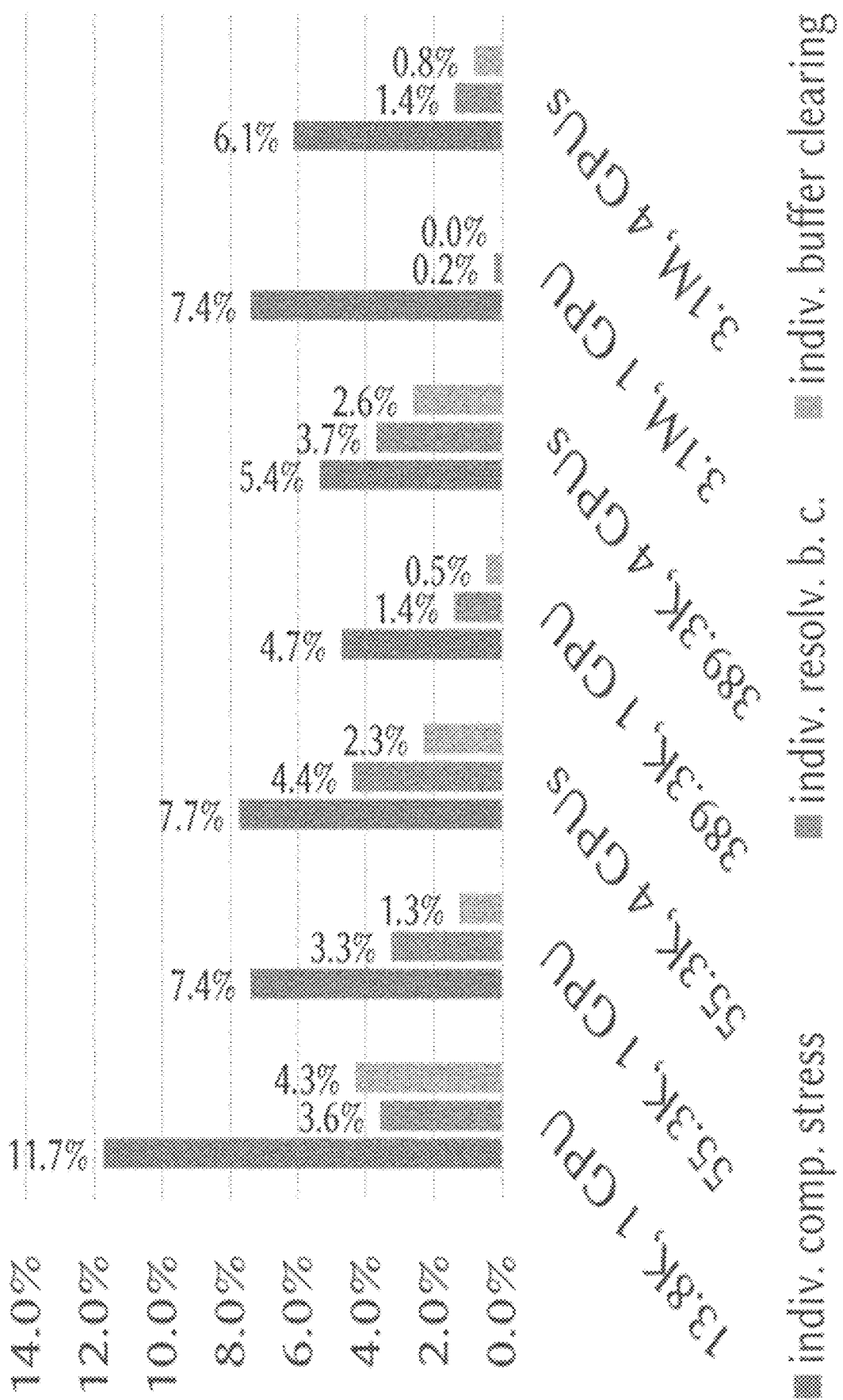

FIGS. 13A and 13B illustrate a performance comparison between the present process including merging small kernels and other processes without merging small kernels, in accordance with some implementations of the present disclosure. FIG. 13A shows the timing (in milliseconds) comparison between the current implementation, the one launching an individual kernel to compute stress before P2G (shown as "indiv. comp. stress"), the one launching an individual kernel to resolve boundary conditions after P2G (shown as "indiv. resolv. b. c."), and the one launching an individual kernel to clear the nodal buffer before P2G (shown as "indiv. buffer clearing"). FIG. 13B shows the percentage of additional costs incurred by the same other processes, relative to the present implementation.

FIGS. 13A and 13B show that merging small kernels into appropriate size boosts the performance as certain global memory operations, e.g., writing and then reading intermediate variables, can be removed.

Compared with the present final process, computing stress with an individual kernel before P2G transfer (indiv. comp. stress) induces 4.7%-11.7% additional cost per frame; resolving boundary condition separately after updating nodal velocities (indiv. resolv. b. c.) induces 0.2%-4.4% additional cost per frame; and clearing nodal buffers with an individual kernel before P2G transfer (indiv. buffer. clearing) brings in as much as 4.3% additional cost per frame. While the small kernels cannot fully utilize the SM (also known as the tail effect), the SM has to finish execution of these kernels before executing any other larger kernels afterward. By integrating these small kernels into the larger kernels following them, the limited computation or memory operations can be overlapped with other heavier computations or memory operations through warp switch, reducing the tail effect with small kernels.

In some embodiments, the present process without merging P2G and G2P transfer into a single G2P2G transfer described above is compared with the process with merging P2G and G2P transfer into a single G2P2G transfer.

Figure 14:
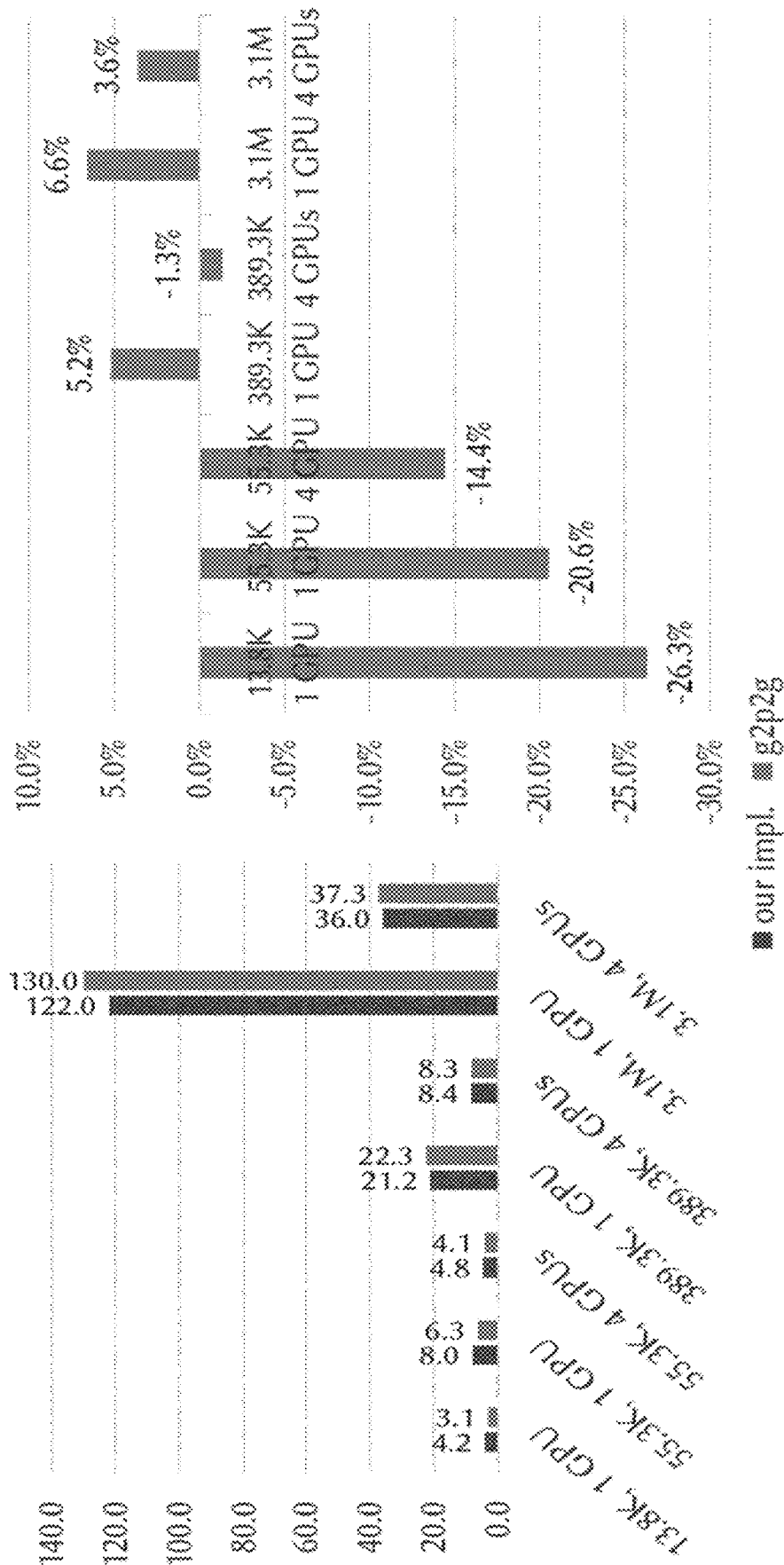
FIG. 14 illustrates a performance comparison between the present process without G2P2G and other process with G2P2G, in accordance with some implementations of the present disclosure.

FIG. 14 illustrates a performance comparison between the present process without G2P2G and other process with G2P2G, in accordance with some implementations of the present disclosure. The left graph of FIG. 14 illustrates the timing (in milliseconds) comparison between the present implementations without G2P2G (shown as "our impl.") and with G2P2G used (shown as "g2p2g"). The right graph of FIG. 14 shows the percentage of additional costs (or decreased costs if negative) incurred by the other process, relative to the present implementation, the default version (not using G2P2G).

FIG. 14 shows that merging P2G and G2P transfer into a single G2P2G transfer, is only beneficial when the number of particles is small as the instruction cache miss rate is still tolerable.

In some embodiments, the present process with 4 warps per CUDA block is compared with the processes with other number of warps per CUDA block.

Figure 15A:
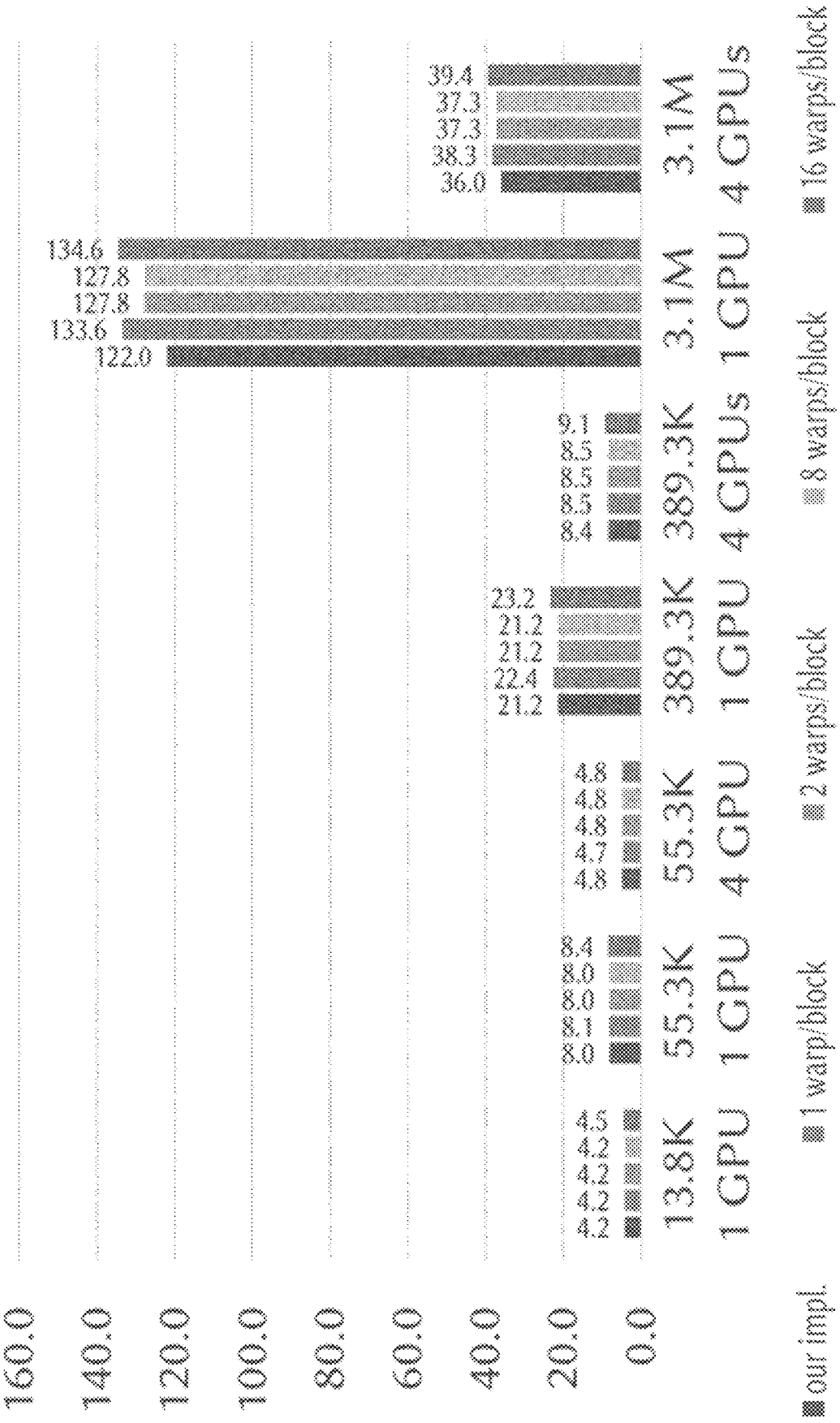
FIGS. 15A and 15B illustrate a performance comparison between the present process with 4 warps per block and other processes with other number of warps per block, in accordance with some implementations of the present disclosure.
Figure 15B:
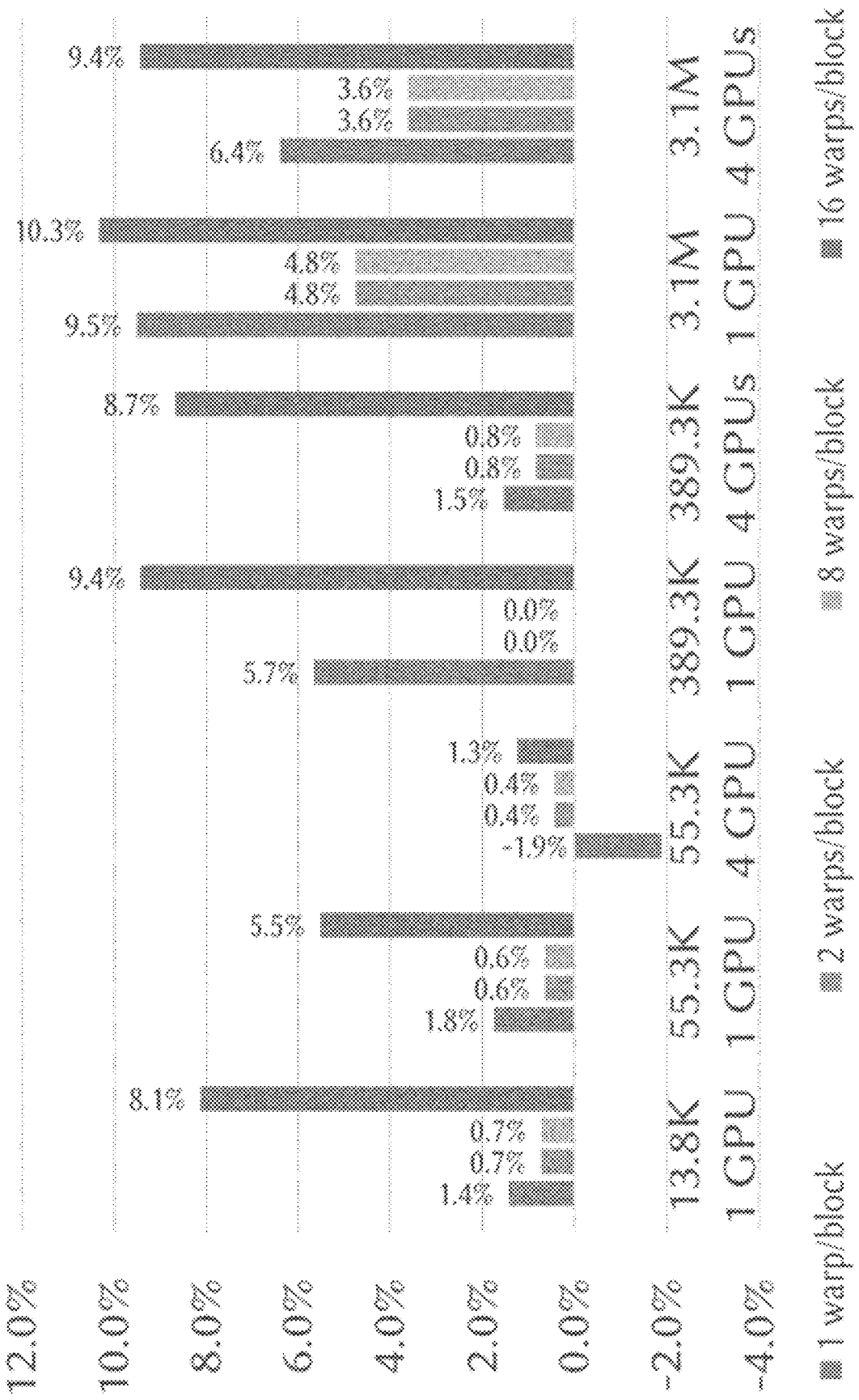

FIGS. 15A and 15B illustrate a performance comparison between the present process with 4 warps per block and other processes with other number of warps per block, in accordance with some implementations of the present disclosure.

FIG. 15A shows the timing (in milliseconds) comparison between implementations with different number of warps, for example, 1, 2, 8 or 16 warps per block, used for each CUDA block (the present implementation uses 4 warps per block shown as "our impl."). FIG. 15B shows the percentage of additional costs incurred by the other processes, relative to the present implementation.

In some embodiments, the present process divides particles into warps, and each CUDA block handles four warps. FIGS. 15A and 15B compare the performance with a different number of warps per CUDA block. The number of simultaneously active blocks on one SM is limited. Thus, when the number of particles is extensive, using 1 or 2 warps per CUDA block would lead to a large number of blocks, and some of them have to stay inactive. On the other hand, CUDA blocks with many warps would need too many registers, resulting in low occupancy.

In the following examples, the comparisons are based on simulations on multiple GPUs.

In some embodiments, the present process with scratch memory for prefix sums is compared with the process without scratch memory for prefix sums.

Figure 16:
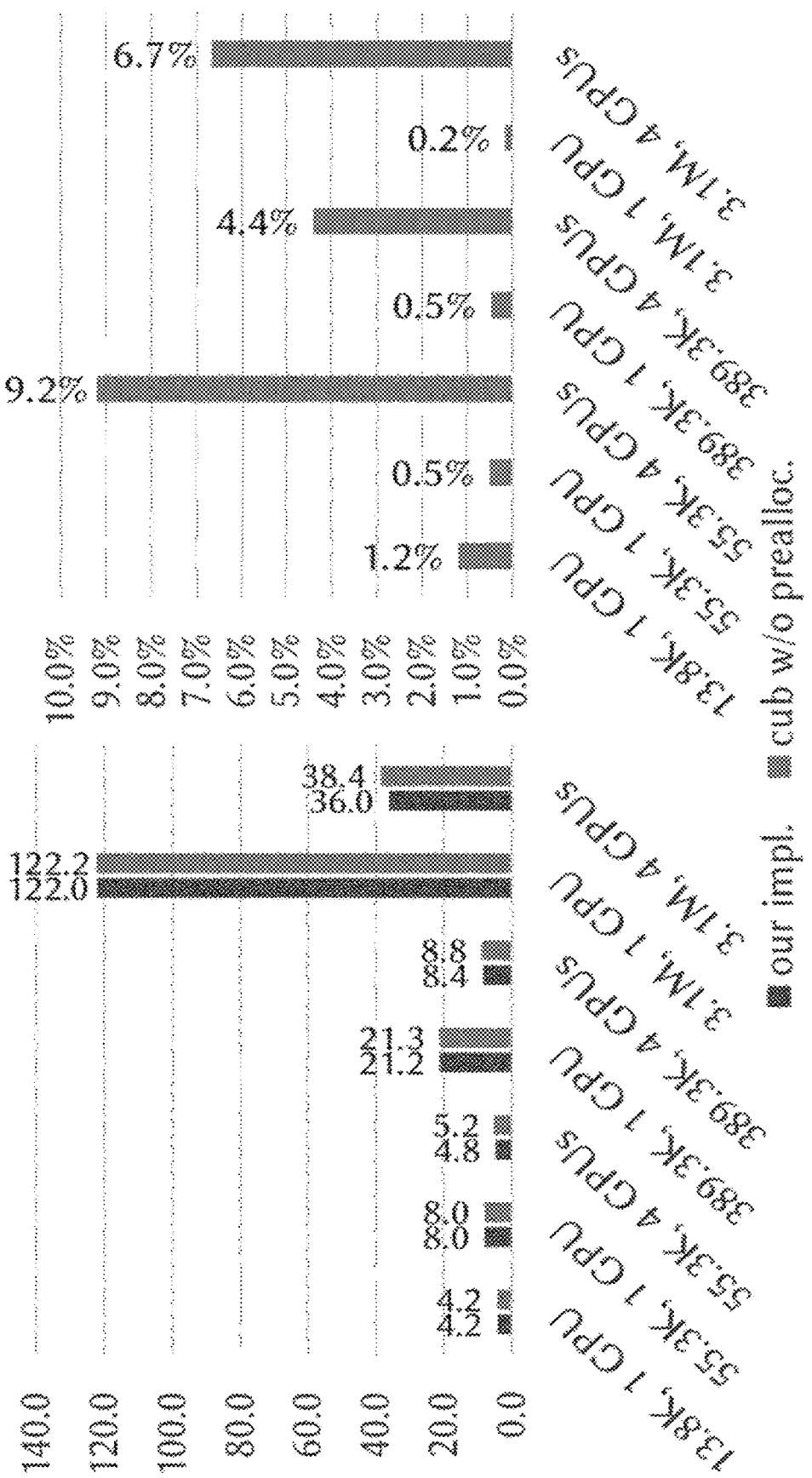
FIG. 16 illustrates a performance comparison between the present process with scratch memory for prefix sums and other process without scratch memory for prefix sums, in accordance with some implementations of the present disclosure.

FIG. 16 illustrates a performance comparison between the present process with scratch memory for prefix sums and other process without scratch memory for prefix sums, in accordance with some implementations of the present disclosure.

The left graph of FIG. 16 shows the timing (in milliseconds) comparison between the current implementation (shown as "our impl.") and the one that does not pre-allocate the scratch memory for the CUB library to perform prefix sums (shown as "cub w/o prealloc"). The right graph of FIG. 16 shows the percentage of additional costs incurred by not pre-allocating the scratch memory, relative to the present implementation.

High-performance parallel prefix sum algorithms, such as the ones in thrust or CUB, may need scratch memory to store their intermediate results. Re-allocating the scratch memory per step may increase the CPU-GPU latency and impact performance, which is more noticeable in a multi-GPU environment. For example, each CPU-GPU pair must wait for the CPU-GPU pair that spends the most time to finish, to begin its next step. FIG. 16 compares between the present implementation, where the scratch memory is allocated if (and only if) necessary with predicted extra space, and the implementation with scratch memory re-allocated per step. The latter introduces 4.4%-9.2% additional cost when simulating with four GPUs.

In some embodiments, the present process with one GPU stream is compared with the process with two GPU streams.

Figure 17:
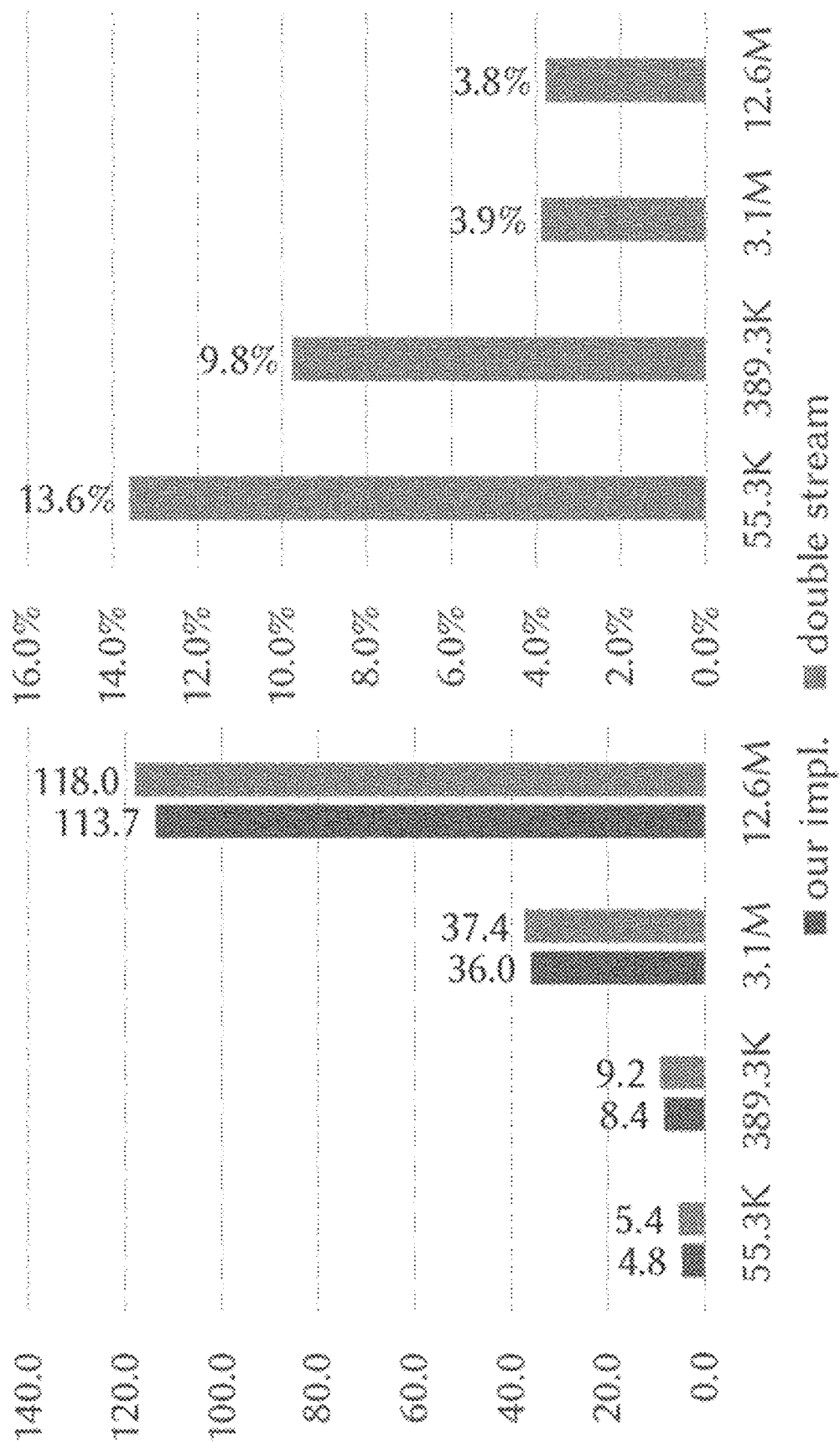
FIG. 17 illustrates a performance comparison between the present process with one GPU stream and other process with two GPU streams, in accordance with some implementations of the present disclosure.

FIG. 17 illustrates a performance comparison between the present process with one GPU stream and other process with two GPU streams, in accordance with some implementations of the present disclosure.

The left graph of FIG. 17 shows the timing (in milliseconds) comparison between the current implementation (shown as "our impl.") and the one that uses two GPU streams to update the nodal velocities after P2G transfer (one stream for the non-shared particle blocks and another stream for the particle blocks shared between multiple GPUs) to manually overlap the computation with inter-GPU data transfer (shown as "double stream"). The right graph of FIG. 17 shows the percentage of additional costs incurred by using two streams, relative to the present implementation. This test involves 4 GPUs for all the scenarios.

In some embodiments, computation and inter-card data transfer is implemented in the present disclosure.

FIG. 17 shows that the present implementation of updating the nodal velocities, using a single stream, and relying on the warp scheduler to overlap memory and computational operations is more effective than using two streams to overlay them manually. The two-stream implementation induces 3.8%-13.6% additional cost. More detailed analysis in Nsight System reveals almost no difference in performance between the GPU kernels using two streams and one stream. However, synchronizations between the two streams require an additional spin-lock to be performed, which introduces additional cost equivalent to what is shown in FIG. 17.

Figure 18:
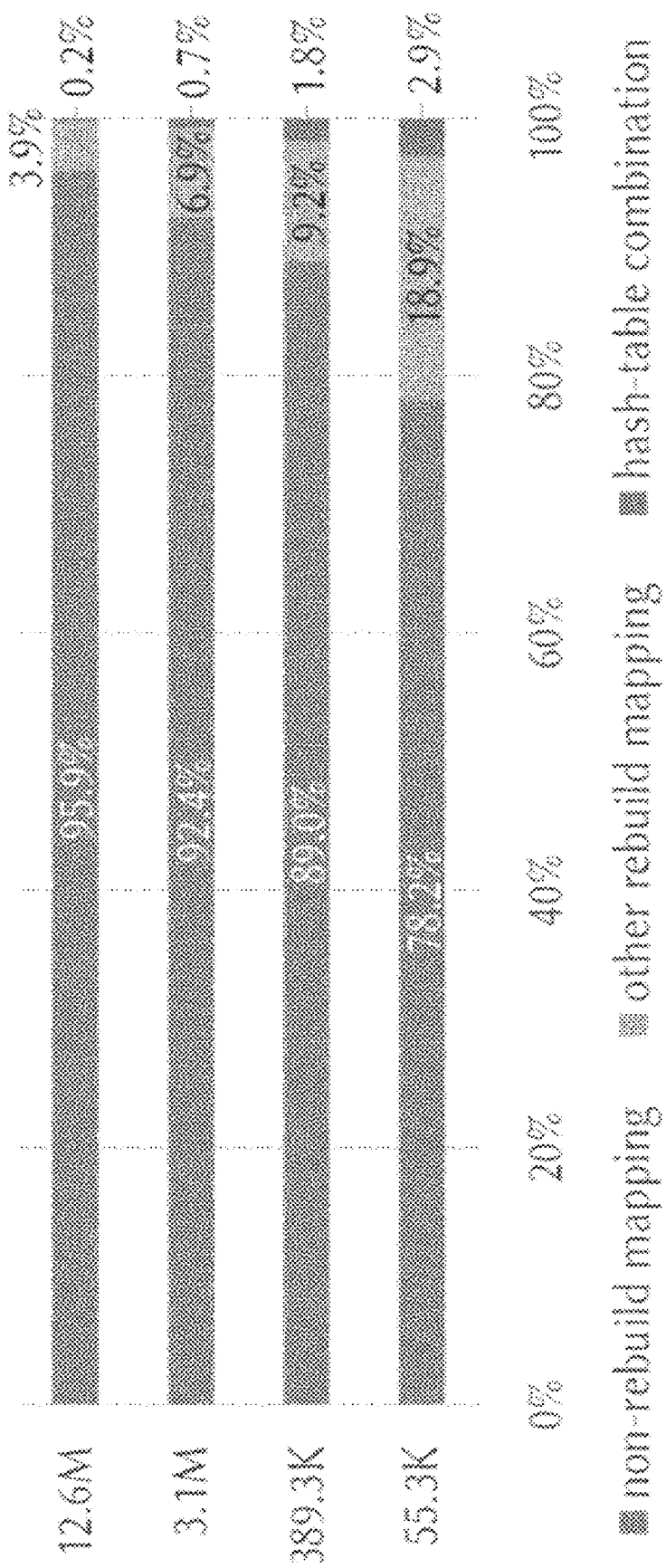
FIG. 18 illustrates the percentage of time spent for simulating one frame of different size of particles, in accordance with some implementations of the present disclosure.

FIG. 18 illustrates the percentage of time spent for simulating one frame of different size of particles, in accordance with some implementations of the present disclosure. As shown in FIG. 18, the "non-rebuild mapping" phase includes P2G and G2P transfer, as well as stress computation during P2G and boundary condition solve during updating the nodal velocities. The "other rebuild mapping" phase includes computing new particle indices and re-sorting particles in order. And the "hash-table combination" phase indicates combining the hashing results from multiple GPUs. This test involves 4 GPUs for all the scenarios.

In some embodiments, hash-table combination and block categorization are implemented in the present disclosure. FIG. 18 shows the combination of hash tables from multiple GPUs is very light-weight, occupying up to 2.9% cost spent per frame even when the number of particles is small (55.3K). Hence, compared with the prior work that spent considerable time on combining hash tables and marking halo blocks, the present combination scheme is much more efficient (as shown in FIG. 4). Since the hash tables are only updated when rebuilding the particle-grid mapping, the current implementation that rebuilds mapping only every 10-30 steps further spends much less time on the combination of the hash tables per frame (as shown in FIG. 5).

Figure 19:
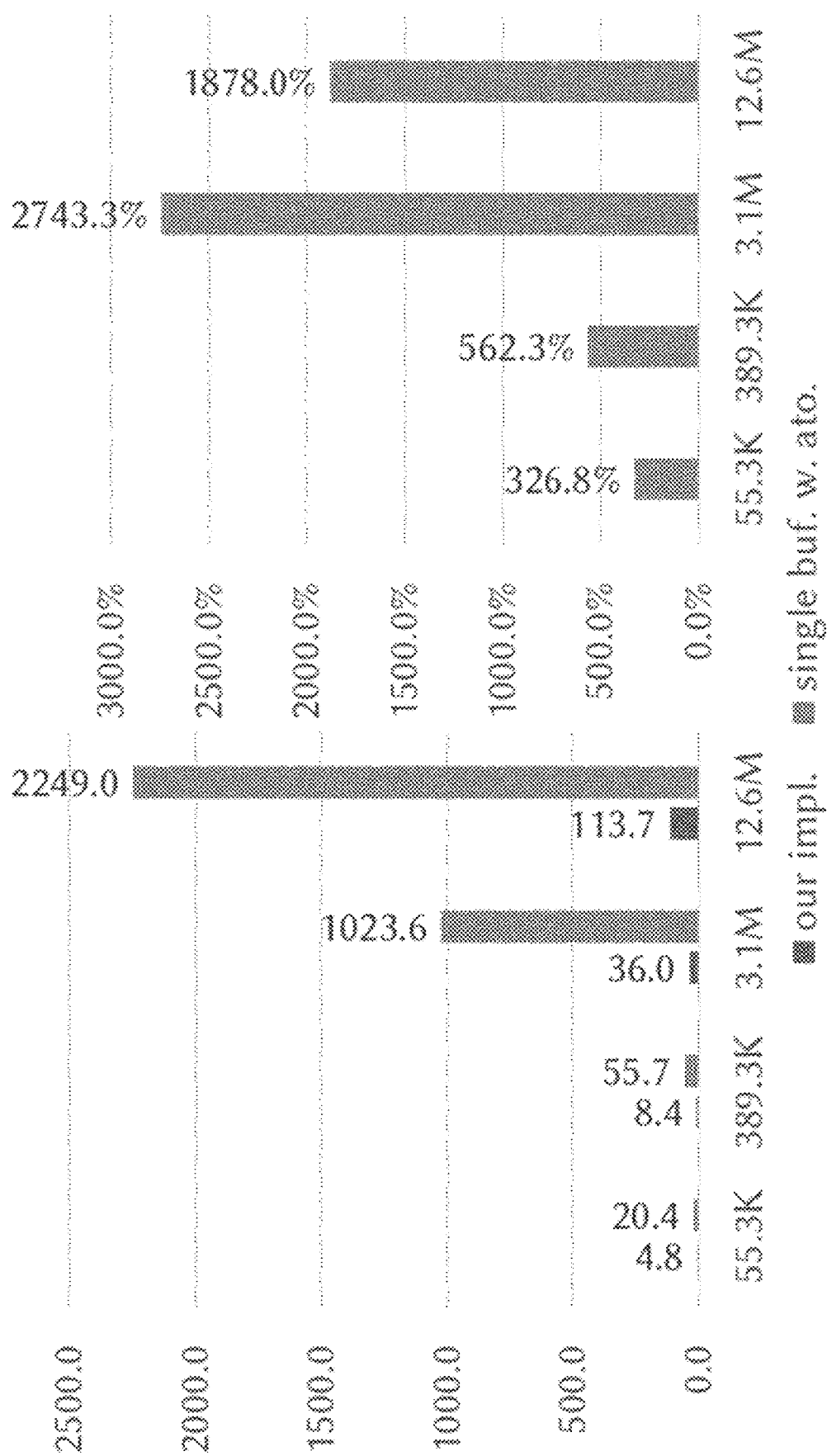
FIG. 19 illustrates a performance comparison between the present process with interleave P2G writing and nodal velocity update and other process that uses only a single buffer and writes nodal data directly through inter-card atomics, in accordance with some implementations of the present disclosure.

FIG. 19 illustrates a performance comparison between the present process with interleave P2G writing and nodal velocity update and other process that uses only a single buffer and writes nodal data directly through inter-card atomics, in accordance with some implementations of the present disclosure.

The left graph of FIG. 19 shows the timing (in milliseconds) comparison between the current implementation (shown as "our impl.") and the one that uses only a single buffer and writes nodal data directly through inter-card atomics (shown as "single buf. w. ato."). The right graph of FIG. 19 shows the percentage of additional costs incurred by the other scheme, relative to the present implementation. This test involves 4 GPUs for all the scenarios.

In some embodiments, interleave P2G writing and nodal velocity update are implemented in the present disclosure.

FIG. 19 compares different schemes for buffering the result of P2G transfer. An alternative to the current implementation is to use inter-card atomics to directly reduce momentum and mass onto other video cards sharing the same node with the current video card. A benefit of this alternative is that it does not need double buffering, which saves almost half video memory compared with the present process. However, this method would be far less efficient in performance than the present process, bringing 326.5%-2743.2% additional cost.

Table 1 below illustrates a GPU spin lock kernel for the synchronization between different GPUs in the present implementation.

TABLE 1 illustrates a GPU spin lock kernel for the synchronization
between different GPUs in the present implementation

```
.....global...... void MultiGPUSpinLock(int current_gpu_id, uint32_t n_gpu,
                                        uint32_t* lock) {
    int counter =
        atomicAdd_system(lock, 1);      /* increase the counter on the spin lock */
    while (counter < n_gpu)             /* wait for the other GPUs */
        counter = atomicCAS_system(lock, n_gpu, n_gpu);
    counter =
        atomicAdd_system(lock, 1);      /* increase the counter again to notify GPU 0
                                           that the current GPU has finished waiting */
    if (current_gpu_id != 0) return;    /* quit if not from GPU 0 */
    while (counter < 2 * n_gpu)         /* wait for all the other GPU's notification */
        counter = atomicCAS_system(lock, 2 * n_gpu, 2 * n_gpu);
    *lock = 0;                          /* GPU 0 resets the spin lock */
}
```

Figure 20:
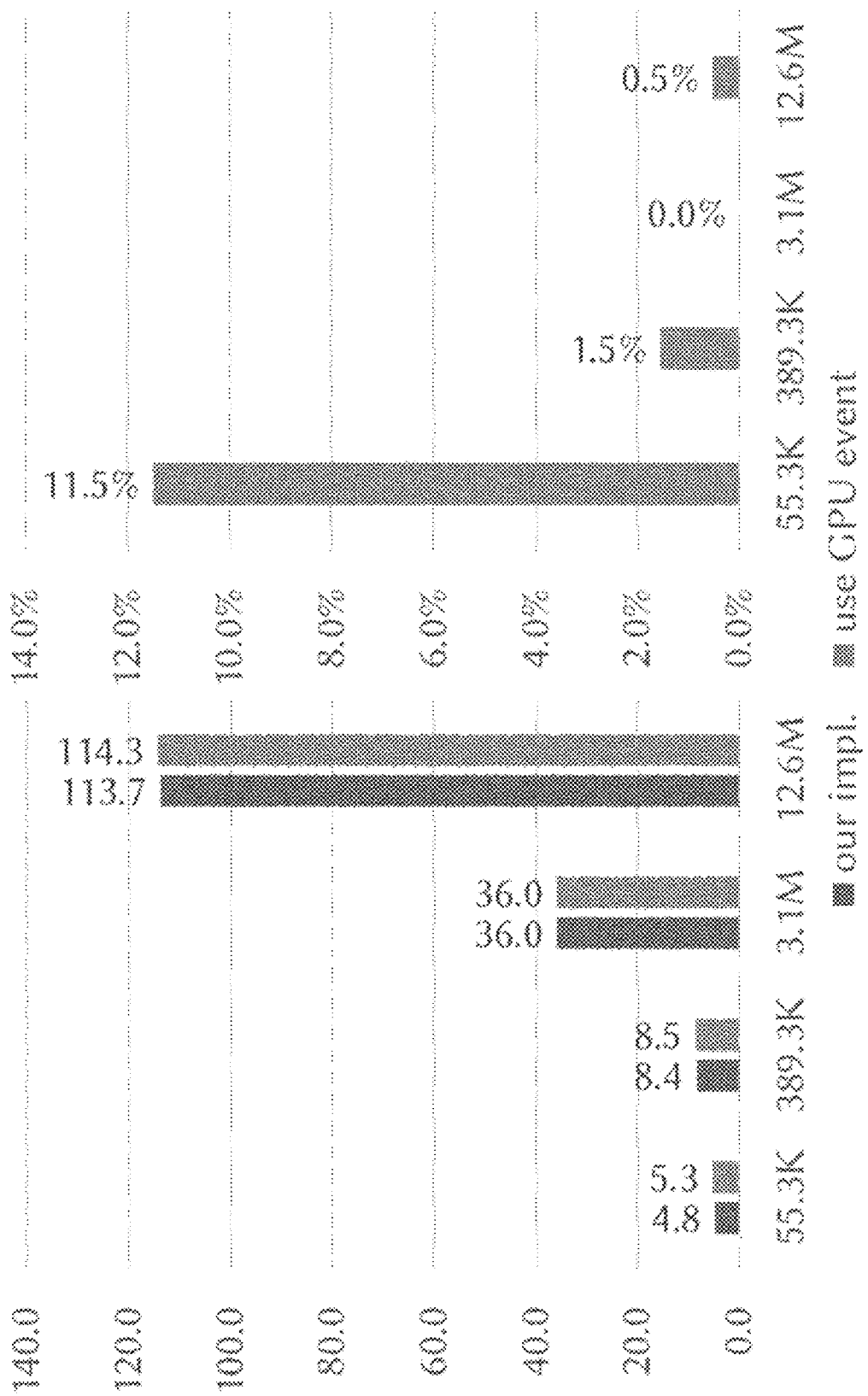
FIG. 20 illustrates a performance comparison between the present process including spin lock kernel and other process that uses cudaStreamWaitEvent, in accordance with some implementations of the present disclosure.

As shown in Table 1, the kernel is executed with a single thread on each GPU, with the GPU id, number of GPUs, and a pointer to integer-sized device memory as the parameters. FIG. 20 illustrates a performance comparison between the present process including spin lock kernel (shown as "our impl.") and other process that uses cudaStreamWaitEvent (shown as "use GPU event"), in accordance with some implementations of the present disclosure.

FIG. 20 shows the timing (in milliseconds) comparison between the present implementation and the one with cudaStreamWaitEvent, as well as the percentage of additional costs incurred by the latter, relative to the present implementation.

In some embodiments, using GPU spin locks as inter-GPU barriers is implemented in the present disclosure.

FIG. 20 compares between using the present spin lock kernel and using the CUDA API cudaStreamWaitEvent for inter-GPU barrier. In the case of a small number of particles (13.8K per card), cudaStreamWaitEvent may cause latency on the CPU that consumes approximately 1.38 ms per frame, while the P2G transfer in this case only takes 0.63 ms. In other words, cudaStreamWaitEvent costs more time than GPU execution, leading to a process bubble before the next kernel execution. In addition, cudaStreamWaitEvent costs in $\mathcal{O}(m^2)$ where m is the number of GPUs, which indicates the delay can be more severe for computation with 8 or 16 cards.

FIG. 21 is a block diagram illustrating an exemplary process 2100 of real time simulation of physical visual effect on one or more Graphics Processing Units (GPUs), in accordance with some implementations of the present disclosure.

In some embodiments, the process 2100 of real time simulation of physical visual effect includes a plurality of time steps 2102.

Each of the plurality of time step includes a step 2104 of building up a mapping between particles and background grid blocks.

Each of the plurality of time step includes a step 2106 of sorting the particles to a level of granularity.

Each of the plurality of time step includes a step 2108 of transferring momenta and masses of the particles to grid nodes on the background grid blocks to compute forces on the grid nodes.

Each of the plurality of time step includes a step 2110 of updating velocities and resolving collisions from the computed forces on the grid nodes.

Each of the plurality of time step includes a step 2112 of applying the updated velocities back to the particles from the grid nodes and advecting the particles.

In some embodiments, the frequency of building up step 2104 and sorting step 2106 is reduced compared with the frequency of transferring step 2108, updating step 2110, and applying step 2112 in the plurality of time steps 2102 as shown in process 2114.

In some embodiments, the step 2104 of building up the mapping between the particles and the background grid blocks includes: allowing the particles to move within a free zone in the background grid blocks without triggering rebuilding the mapping.

In some embodiments, the step 2104 of building up the mapping between the particles and the background grid blocks further includes: building up the mapping between the particles and the background grid blocks once at least every four of the time steps.

In some embodiments, the step 2106 of sorting the particles to the level of granularity includes: sorting the particles with respect to particle blocks and sorting the particles with respect to the cells.

In some embodiments, sorting the particles with respect to the particle blocks is not performed when the particles are inside a free zone.

In some embodiments, the step 2106 of sorting the particles to the level of granularity is performed when building up the mapping is performed within a same time step.

In some embodiments, the step 2108 of transferring the momenta and masses of the particles to the grid nodes on the background grid blocks to compute the forces on the grid nodes includes: directly writing back to a global memory via native atomics when performing the transferring.

In some embodiments, the background grid blocks are tagged to identify a first type of blocks shared by multiple GPUs and a second type of blocks not shared by multiple GPUs.

In some embodiments, the process 2100 of real time simulation of physical visual effect includes further includes: performing a data reduction to the second type of blocks not shared by multiple GPUs after the transferring the momenta and masses of the particles to the grid nodes 2108.

In some embodiments, the step 2104 of building up the mapping between the particles and the background grid blocks includes: dividing the particles into warps, the particles in a same warp originated from a same background grid block.

In some embodiments, the step 2108 of transferring the momenta and masses of the particles to the grid nodes on the background grid blocks to compute the forces on the grid nodes is performed in a same computing kernel.

Further embodiments also include various subsets of the above embodiments combined or otherwise re-arranged in various other embodiments.

Herein, an image processing apparatus of the embodiments of the present application is implemented with reference to descriptions of accompanying drawings. The image processing apparatus may be implemented in various forms, for example, different types of computer devices such as a server or a terminal (for example, a desktop computer, a notebook computer, or a smartphone). A hardware structure of the image processing apparatus of the embodiments of the present application is further described below. It may be understood that FIG. 22 merely shows an exemplary structure, rather than all structures, of the image processing apparatus, and a partial or entire structure shown in FIG. 22 may be implemented according to requirements.

Figure 22:
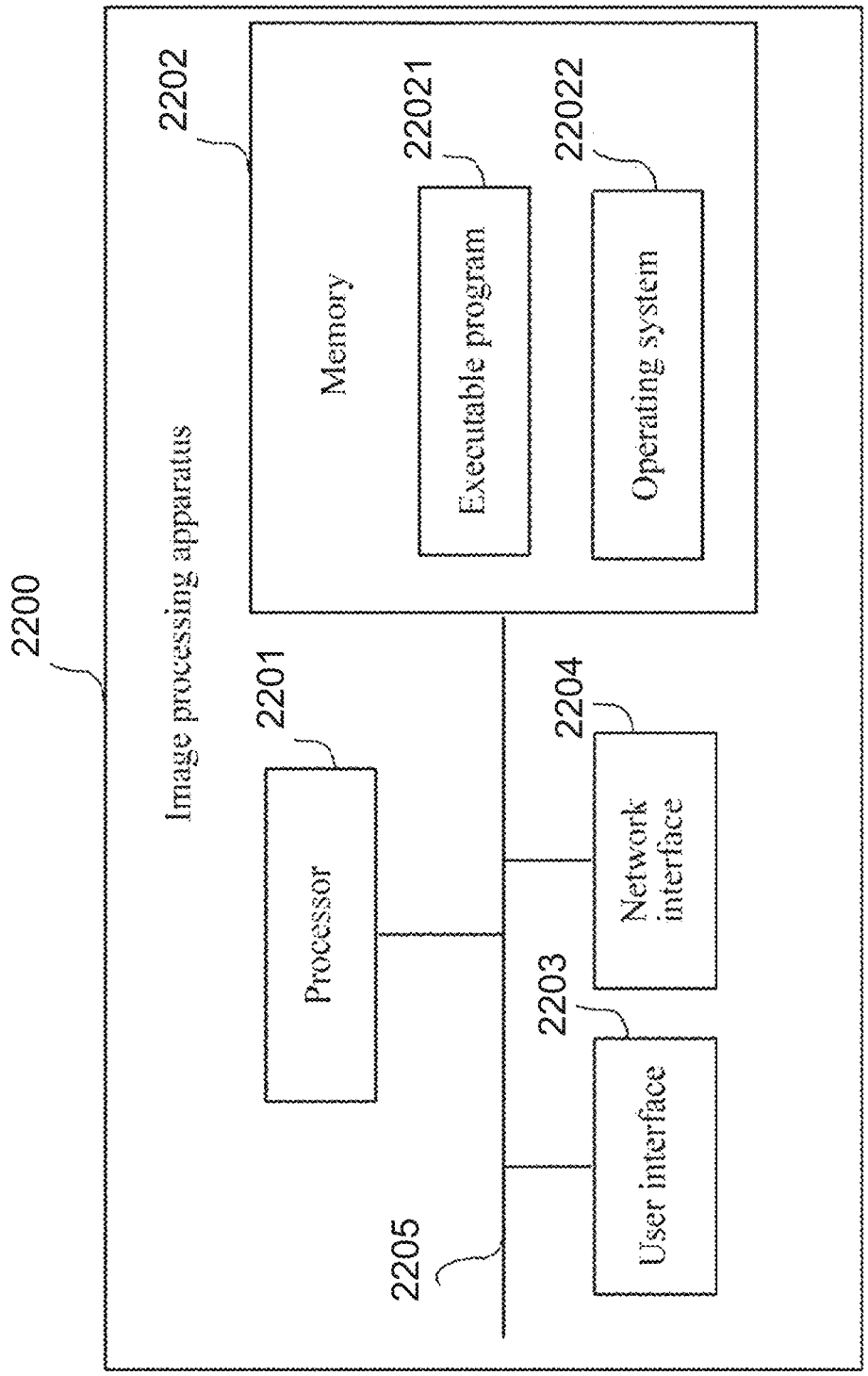
FIG. 22 is a schematic diagram of an exemplary hardware structure of an image processing apparatus in accordance with some implementations of the present disclosure.

Referring to FIG. 22, FIG. 22 is a schematic diagram of an optional hardware structure of an image processing apparatus according to an embodiment of the present application, and in an actual application, may be applied to the server or various terminals running an application program. An image processing apparatus 2200 shown in FIG. 22 includes: at least one processor 2201, a memory 2202, a user interface 2203, and at least one network interface 2204. Components in the image processing apparatus 2200 are coupled together by means of a bus system 2205. It may be understood that the bus 2205 is configured to implement connection and communication between the components. The bus system 2205, besides including a data bus, may further include a power bus, a control bus, and a status signal bus. However, for a purpose of a clear explanation, all buses are marked as the bus system 2205 in FIG. 22.

The user interface 2203 may include a display, a keyboard, a mouse, a trackball, a click wheel, a key, a button, a touchpad, a touchscreen, or the like.

It may be understood that the memory 2202 may be a volatile memory or a non-volatile memory, or may include both a volatile memory and a non-volatile memory.

The memory 2202 in the embodiments of the present application is configured to store different types of data to support operations of the image processing apparatus 2200. Examples of the data include: any computer program, such as an executable program 22021 and an operating system 22022, used to perform operations on the image processing apparatus 2200, and a program used to perform the image processing method of the embodiments of the present application may be included in the executable program 22021.

The image processing method disclosed in the embodiments of the present application may be applied to the processor 2201, or may be performed by the processor 2201. The processor 2201 may be an integrated circuit chip and has a signal processing capability. In an implementation process, each step of the image processing method may be completed by using an integrated logic circuit of hardware in the processor 2201 or an instruction in a software form. The foregoing processor 2201 may be a general-purpose processor, a digital signal processor (DSP), another programmable logic device, a discrete gate, a transistor logic device, a discrete hardware component, or the like. The processor 2201 may implement or execute methods, steps, and logical block diagrams provided in the embodiments of the present application. The general purpose processor may be a microprocessor, any conventional processor, or the like. The steps in the method provided in the embodiments of the present application may be directly performed by a hardware decoding processor, or may be performed by combining hardware and software modules in a decoding processor. The software module may be located in a storage medium. The storage medium is located in the memory 2202. The processor 2201 reads information in the memory 2202 and performs steps of the image processing method provided in the embodiments of the present application by combining the information with hardware thereof.

In some embodiments, simulating the visual effect of avalanche of the media can be accomplished on a group of servers or a cloud on a network.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of real time simulation of physical visual effect on multiple Graphics Processing Units (GPUs), comprising:
   within a plurality of time steps:
      building up a mapping between particles and background grid blocks, wherein the background grid blocks are tagged to identify a first type of blocks shared by the multiple GPUs and a second type of blocks not shared by the multiple GPUs;
      sorting the particles to a level of granularity;
      transferring momenta and masses of the particles to grid nodes on the background grid blocks to compute forces on the grid nodes;
      updating velocities and resolving collisions from the computed forces on the grid nodes; and
      applying the updated velocities back to the particles from the grid nodes and advecting the particles;
   wherein frequency of building up and sorting is reduced compared with frequency of transferring, updating, and applying in the plurality of time steps.

2. The method according to claim 1, wherein building up the mapping between the particles and the background grid blocks includes:
   allowing the particles to move within a free zone in the background grid blocks without triggering rebuilding the mapping.

3. The method according to claim 2, wherein building up the mapping between the particles and the background grid blocks further includes:
   building up the mapping between the particles and the background grid blocks once at least every four of the time steps.

4. The method according to claim 3, wherein sorting the particles to the level of granularity is performed when building up the mapping is performed within a same time step.

5. The method according to claim 1, wherein sorting the particles to the level of granularity includes:
   sorting the particles with respect to particle blocks and sorting the particles with respect to cells.

6. The method according to claim 5, wherein sorting the particles with respect to the particle blocks is not performed when the particles are inside a free zone.

7. The method according to claim 1, wherein transferring the momenta and masses of the particles to the grid nodes on the background grid blocks to compute the forces on the grid nodes includes:
   directly writing back to a global memory via native atomics when performing the transferring.

8. The method according to claim 1, further comprising:
   performing a data reduction to the second type of blocks not shared by the multiple GPUs after the transferring the momenta and masses of the particles to the grid nodes.

9. The method according to claim 1, wherein building up the mapping between the particles and the background grid blocks includes: dividing the particles into warps, the particles in a same warp originated from a same background grid block.

10. The method according to claim 1, wherein transferring the momenta and masses of the particles to the grid nodes on the background grid blocks to compute the forces on the grid nodes is performed in a same computing kernel.

11. An electronic apparatus comprising one or more processing units, memory coupled to the one or more processing units, and a plurality of programs stored in the memory that, when executed by the one or more processing units, cause the electronic apparatus to perform a plurality of operations of real time simulation of physical visual effect on multiple GPUs, comprising:
   within a plurality of time steps:
      building up a mapping between particles and background grid blocks, wherein the background grid blocks are tagged to identify a first type of blocks shared by the multiple GPUs and a second type of blocks not shared by the multiple GPUs;
      sorting the particles to a level of granularity;
      transferring momenta and masses of the particles to grid nodes on the background grid blocks to compute forces on the grid nodes;
      updating velocities and resolving collisions from the computed forces on the grid nodes; and
      applying the updated velocities back to the particles from the grid nodes and advecting the particles;
   wherein frequency of building up and sorting is reduced compared with frequency of transferring, updating, and applying in the plurality of time steps.

12. The electronic apparatus according to claim 11, wherein building up the mapping between the particles and the background grid blocks includes:
   allowing the particles to move within a free zone in the background grid blocks without triggering rebuilding the mapping.

13. The electronic apparatus according to claim 12, wherein building up the mapping between the particles and the background grid blocks further includes:

building up the mapping between the particles and the background grid blocks once at least every four of the time steps.

14. The electronic apparatus according to claim 13, wherein sorting the particles to the level of granularity is performed when building up the mapping is performed within a same time step.

15. The electronic apparatus according to claim 11, wherein sorting the particles to the level of granularity includes:
sorting the particles with respect to particle blocks and sorting the particles with respect to cells.

16. The electronic apparatus according to claim 15, wherein sorting the particles with respect to the particle blocks is not performed when the particles are inside a free zone.

17. The electronic apparatus according to claim 11, wherein transferring the momenta and masses of the particles to the grid nodes on the background grid blocks to compute the forces on the grid nodes includes:
directly writing back to a global memory via native atomics when performing the transferring.

18. The electronic apparatus according to claim 11, wherein building up the mapping between the particles and the background grid blocks includes: dividing the particles into warps, the particles in a same warp originated from a same background grid block.

19. A non-transitory computer readable storage medium storing a plurality of programs for execution by an electronic apparatus having one or more processing units, wherein the plurality of programs, when executed by the one or more processing units, cause the electronic apparatus to perform a plurality of operations of real time simulation of physical visual effect on multiple GPUs, comprising:
within a plurality of time steps:
building up a mapping between particles and background grid blocks, wherein the background grid blocks are tagged to identify a first type of blocks shared by the multiple GPUs and a second type of blocks not shared by the multiple GPUs;
sorting the particles to a level of granularity;
transferring momenta and masses of the particles to grid nodes on the background grid blocks to compute forces on the grid nodes;
updating velocities and resolving collisions from the computed forces on the grid nodes; and
applying the updated velocities back to the particles from the grid nodes and advecting the particles;
wherein frequency of building up and sorting is reduced compared with frequency of transferring, updating, and applying in the plurality of time steps.

* * * * *